(12) United States Patent
Inagaki et al.

(10) Patent No.: US 7,923,152 B2
(45) Date of Patent: *Apr. 12, 2011

(54) NONAQUEOUS ELECTROLYTE BATTERY, BATTERY PACK AND VEHICLE

(75) Inventors: Hiroki Inagaki, Kanagawa-ken (JP); Nori Takami, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 464 days.

This patent is subject to a terminal disclaimer.

(21) Appl. No.: 11/694,454

(22) Filed: Mar. 30, 2007

(65) Prior Publication Data
US 2007/0231693 A1   Oct. 4, 2007

(30) Foreign Application Priority Data
Mar. 30, 2006  (JP) ............... P2006-095019

(51) Int. Cl.
*H01M 4/58* (2010.01)
*H01M 4/00* (2010.01)
*H01M 4/50* (2010.01)

(52) U.S. Cl. .......... 429/231.1; 429/221; 429/223; 429/224; 429/231.2; 429/231.3

(58) Field of Classification Search .......... 429/152, 429/221, 223, 224, 231.3, 231.5
See application file for complete search history.

(56) References Cited

U.S. PATENT DOCUMENTS

| | | | | |
|---|---|---|---|---|
| 6,400,323 | B2 * | 6/2002 | Yasukawa et al. | 343/700 MS |
| 2002/0102204 | A1 * | 8/2002 | Kohiro et al. | 423/594 |
| 2003/0010631 | A1 * | 1/2003 | Anzai | 204/293 |
| 2003/0232243 | A1 * | 12/2003 | Hong | 429/161 |
| 2005/0064282 | A1 * | 3/2005 | Inagaki et al. | 429/163 |
| 2005/0069777 | A1 * | 3/2005 | Takami et al. | 429/245 |
| 2005/0221173 | A1 | 10/2005 | Tatebayashi et al. | |
| 2005/0221187 | A1 | 10/2005 | Inagaki et al. | |
| 2005/0221188 | A1 * | 10/2005 | Takami et al. | 429/231.95 |
| 2006/0046137 | A1 * | 3/2006 | Kodama | 429/129 |
| 2006/0046155 | A1 | 3/2006 | Inagaki et al. | |
| 2006/0068272 | A1 | 3/2006 | Takami et al. | |
| 2006/0134520 | A1 | 6/2006 | Ishii et al. | |
| 2006/0177737 | A1 * | 8/2006 | Tode et al. | 429/231.1 |
| 2006/0216600 | A1 | 9/2006 | Inagaki et al. | |

(Continued)

FOREIGN PATENT DOCUMENTS
JP           9-199179        7/1997
(Continued)

OTHER PUBLICATIONS
U.S. Appl. No. 11/687,860, filed Mar. 19, 2007, Fujita, et al.
(Continued)

*Primary Examiner* — Patrick Ryan
*Assistant Examiner* — Muhammad Siddiquee
(74) *Attorney, Agent, or Firm* — Oblon, Spivak, McClelland, Maier & Neustadt, L.L.P.

(57) ABSTRACT

A nonaqueous electrolyte battery includes a positive electrode containing a lithium-transition metal oxide having a layered crystal structure; a negative electrode containing a lithium-titanium composite oxide having a spinel structure; and a nonaqueous electrolyte. The positive electrode and the negative electrode satisfy the formula (1) given below:

$$1.25 \leq X \qquad (1),$$

where X is a ratio of an available electric capacity, represented by "(B/A)", A is an available electric capacity (mAh) at 25° C. per $cm^2$ of the positive electrode, and B is an available electric capacity (mAh) at 25° C. per $cm^2$ of the negative electrode.

20 Claims, 17 Drawing Sheets

U.S. PATENT DOCUMENTS

| | | |
|---|---|---|
| 2006/0257746 A1 | 11/2006 | Inagaki et al. |
| 2007/0009794 A1 | 1/2007 | Takami et al. |
| 2007/0009797 A1 | 1/2007 | Takami et al. |
| 2007/0009798 A1 | 1/2007 | Inagaki et al. |
| 2007/0009801 A1 | 1/2007 | Inagaki et al. |
| 2007/0042264 A1* | 2/2007 | Desilvestro et al. .......... 429/152 |
| 2007/0059592 A1 | 3/2007 | Takami et al. |
| 2007/0059602 A1 | 3/2007 | Morishima et al. |
| 2007/0072080 A1 | 3/2007 | Inagaki et al. |
| 2008/0070115 A1 | 3/2008 | Saruwatari et al. |

FOREIGN PATENT DOCUMENTS

| | | |
|---|---|---|
| JP | 10-69922 | 3/1998 |
| JP | 2000-12090 | 1/2000 |
| JP | 2000-260472 | 9/2000 |
| JP | 2001-28273 | 1/2001 |
| JP | 2001-243952 | 9/2001 |
| JP | 2004-47167 | 2/2004 |
| JP | 2004-171955 | 6/2004 |
| JP | 2004-207119 | 7/2004 |
| JP | 2005-123183 | 5/2005 |
| JP | 2005-203341 | 7/2005 |
| JP | 2005-317512 | 11/2005 |
| WO | WO/2005018038 A2 * | 2/2005 |

OTHER PUBLICATIONS

U.S. Appl. No. 11/687,844, filed Mar. 19, 2007, Fujita, et al.
U.S. Appl. No. 12/047,857, filed Mar. 13, 2008, Ishii, et al.
U.S. Appl. No. 11/756,259, filed May 31, 2007, Saruwatari, et al.
U.S. Appl. No. 11/855,587, filed Sep. 14, 2007, Inagaki, et al.
U.S. Appl. No. 11/940,688, filed Nov. 15, 2007, Inagaki, et al.

* cited by examiner

NONAQUEOUS ELECTROLYTE BATTERY, BATTERY PACK AND VEHICLE

CROSS-REFERENCE TO RELATED APPLICATION

This application is based upon and claims the benefit of priority from prior Japanese Patent Application No. 2006-95019, filed Mar. 30, 2006, the entire contents of which are incorporated herein by reference.

BACKGROUND OF THE INVENTION

1. Field of the Invention

The present invention relates to a nonaqueous electrolyte battery, to a battery pack using the nonaqueous electrolyte battery and to a vehicle using the nonaqueous electrolyte battery.

2. Description of the Related Art

A nonaqueous electrolyte battery has attracted attention as a battery having a high energy density, and vigorous research is being conducted on a nonaqueous electrolyte battery that is charged and discharged by the migration of Li ions between the negative electrode and the positive electrode.

Various properties are required for the nonaqueous electrolyte battery depending on the use of the battery. For example, long charge-discharge cycle characteristics under a high temperature environment are required when it comes to a nonaqueous electrolyte battery mounted on a vehicle such as a hybrid electric vehicle or used for the emergency power supply of an electronic apparatus.

Generally used nowadays is a nonaqueous electrolyte battery in which a lithium-transition metal composite oxide is used as a positive electrode active material and a carbonaceous material is used as a negative electrode active material.

In recent years, a nonaqueous electrolyte battery in which a lithium-titanium composite oxide having a Li absorption-release potential higher than 1.0 V is used as the negative electrode active material has been put to practical use. Since the lithium-titanium composite oxide is small in the change of volume accompanying the charge-discharge operation of the battery, the lithium-titanium composite oxide is expected to impart excellent charge-discharge cycle characteristics to the battery.

Among the lithium-titanium composite oxides, the spinel type lithium-titanium composite oxide is particularly excellent in the charge-discharge cycle characteristics and is expected to be prominently useful. JP-A No. 9 199179(KOKAI) discloses a lithium ion battery in which lithium titanate is used as a negative electrode material. The lithium-titanium composite oxide also includes ramsdellite type lithium-titanium composite oxide having a composition formula of $Li_2Ti_3O_7$, as disclosed in JP-A No. 2000-12090(KOKAI).

On the other hand, JP-A No. 10-69922(KOKAI) discloses a nonaqueous electrolyte lithium secondary battery comprising a negative electrode formed mainly of the spinel type lithium-titanium composite oxide and a positive electrode having a potential higher than that of the spinel type lithium-titanium composite oxide. It is disclosed in this patent document that, if the ratio of the electric capacity of the negative electrode to that of the positive electrode is increased to 1.1 or 1.2, the positive electrode potential is markedly lowered to a value in the vicinity of zero in the last period of the discharge to degrade the positive electrode characteristics, leading to deterioration of the capacity.

On the other hand, JP-A No. 2004-171955(KOKAI) relates to a bipolar battery comprising a bipolar electrode including a current collector, a positive electrode active material layer formed on one surface of the current collector, and a negative electrode active material layer formed on the other surface of the current collector. It is disclosed that a plurality of bipolar electrodes constructed as described above are stacked one upon the other with an electrolyte layer sandwiched therebetween so as to provide the bipolar battery. In this prior art, a changeable electrode active material and an unchangeable electrode active material are used in the electrode active material layers. The changeable electrode active material exhibits the characteristics that, when the charge capacity is reached, the voltage is changed in a manner to exceed the rate of change of the voltage before the charge capacity is reached. On the other hand, unchangeable electrode active material exhibits the characteristics that, even if the charge capacity of the changeable electrode active material is reached, the rate of change of the voltage is substantially left unchanged. In this prior art, the changeable electrode active material is used in the positive electrode active material layer or the negative electrode active material layer, and the unchangeable electrode material is used in the other electrode active material layer. The particular construction permits the bipolar battery to exhibit the characteristics that the change of voltage in the end period of the charging is increased in a manner to exceed the previous rate of change of the voltage. As a result, it is possible to prevent an over charge of the battery module. In Example 1 of JP-A No. 2004-171955(KOKAI) referred to above, the positive electrode active material layer containing spinel type lithium manganate is used as the changeable electrode, and a negative electrode active material layer containing lithium titanate is used as the unchangeable electrode. It is taught that the charge capacity of the negative electrode active material layer (unchangeable electrode) is set at 120% of the charge capacity of the positive electrode active material layer (changeable electrode) so as to increase the change of voltage in the end period of the charging of the bipolar battery. It is also taught in Example 2 of the patent document quoted above that, if the charge capacity of the positive electrode active material layer is set at 120% of the charge capacity of the negative electrode active material layer, it is possible to change the negative electrode active material layer into the changeable electrode. Further, it is taught in this patent document that $LiFePO_4$ can be used as the positive electrode active material.

SUMMARY OF THE INVENTION

The present invention provides a nonaqueous electrolyte battery excellent in charge-discharge cycle characteristics under an environment of a high temperature such as 60° C., a battery pack using the nonaqueous electrolyte battery and a vehicle using the nonaqueous electrolyte battery.

According to a first aspect of the present invention, there is provided a nonaqueous electrolyte battery comprising:

a positive electrode containing a lithium-transition metal oxide having a layered crystal structure;

a negative electrode containing a lithium-titanium composite oxide having a spinel structure; and a nonaqueous electrolyte, wherein the positive electrode and the negative electrode satisfy the formula (1) given below:

$$1.25 \leq X \quad (1)$$

where X is a ratio of an available electric capacity, represented by "(B/A)", A is an available electric capacity (mAh)

at 25° C. per cm² of the positive electrode, and B is an available electric capacity (mAh) at 25° C. per cm² of the negative electrode.

According to a second aspect of the present invention, there is provided a battery pack comprising nonaqueous electrolyte batteries, each comprising:

a positive electrode containing a lithium-transition metal oxide having a layered crystal structure;

a negative electrode containing a lithium-titanium composite oxide having a spinel structure; and a nonaqueous electrolyte, wherein the positive electrodes and the negative electrodes satisfy the formula (1) given below:

$$1.25 \leq X \tag{1}$$

where X is a ratio of an available electric capacity, represented by "(B/A)", A is an available electric capacity (mAh) at 25° C. per cm² of each of the positive electrodes, and B is an available electric capacity (mAh) at 25° per cm² of each of the negative electrodes.

According to a third aspect of the present invention, there is provided a vehicle comprising a battery pack, the battery pack comprising nonaqueous electrolyte batteries, each comprising:

a positive electrode containing a lithium-transition metal oxide having a layered crystal structure;

a negative electrode containing a lithium-titanium composite oxide having a spinel structure; and a nonaqueous electrolyte, wherein the positive electrodes and the negative electrodes satisfy the formula (1) given below:

$$1.25 \leq X \tag{1}$$

where X is a ratio of an available electric capacity, represented by "(B/A)", A is an available electric capacity (mAh) at 25° C. per cm² of each of the positive electrodes, and B is an available electric capacity (mAh) at 25° C. per cm² of each of the negative electrodes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
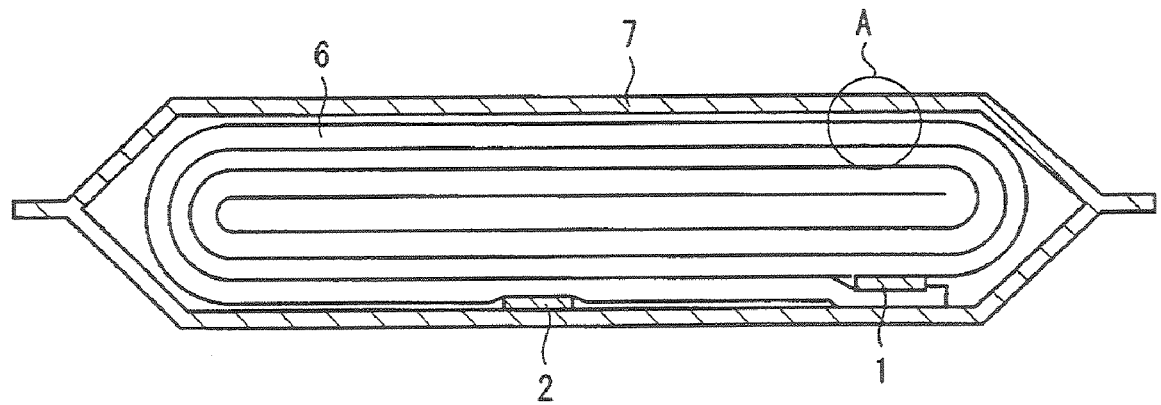
FIG. 1A is a cross-sectional view schematically showing as an example the construction of a nonaqueous electrolyte battery according to the first embodiment.

Referring now to the drawings, wherein like reference numerals designate identical or corresponding parts throughout the several views.

As a result of extensive research, the present inventors have found that a nonaqueous electrolyte battery comprising a lithium-titanium composite oxide used as the negative electrode active material and a lithium-transition metal composite oxide used as the positive electrode active material is low in the charge-discharge cycle characteristics. Particularly, it has been found that the charge-discharge cycle characteristics of the battery pack are significantly impaired in a high temperature environment.

For example, when it comes to a nonaqueous electrolyte battery comprising a lithium-titanium composite oxide having a spinel structure (hereinafter referred to a spinel type lithium-titanium composite oxide) used as the negative electrode active material and a lithium-cobalt composite oxide used as the positive electrode active material, the number of charge-discharge cycles which reaches the discharge capacity retention ratio of 80% was found to be smaller than 100 under a temperature environment of 45° C. in the case where the available electric capacity of the negative electrode was set equal to that of the positive electrode at a temperature environment of 25° C.

The mechanism for deterioration of the charge-discharge cycle characteristics noted above will now be described.

The deterioration of the charge-discharge cycle characteristics under an environment of a high temperature noted above is derived from the situation that the increase in the available electric capacity of the negative electrode accompanying the temperature elevation is larger than that of the positive electrode. Therefore, if the available electric capacity of the negative electrode at room temperature is smaller than that of the positive electrode, the balance in the available electric capacity between the positive electrode and the negative electrode collapses under an environment of high temperature, with the result that the positive electrode is caused to assume an over-charged state in the ordinary charge-discharge cycle and, thus, the charge-discharge cycle characteristics are markedly impaired.

The deterioration of the charge-discharge cycle characteristics will now be described in detail with reference to FIG. 17. To be more specific, FIG. 17 is a graph showing the dependence on temperature of the charge-discharge curve in respect of the positive electrode potential, the negative electrode potential and the battery voltage.

The charge-discharge curve is directed to a nonaqueous electrolyte battery using the spinel type lithium-titanium composite oxide in the negative electrode and a lithium-cobalt composite oxide in the positive electrode and designed such that the positive electrode and the negative electrode are equal to each other in the available electric capacity. For preparation of the graph shown in FIG. 17, the positive electrode potential, the negative electrode potential and the battery voltage were measured under a constant current under a temperature environment of 25° C., 45° C. and 60° C. In this case, it is appropriate to carry out the charge-discharge cycle within the battery voltage range of 1.5 V to 2.8 V. Incidentally, the range of the battery voltage in the charge-discharge cycle operation was set on the basis that the temperature of the environment was set at 25° C.

Figure 17:
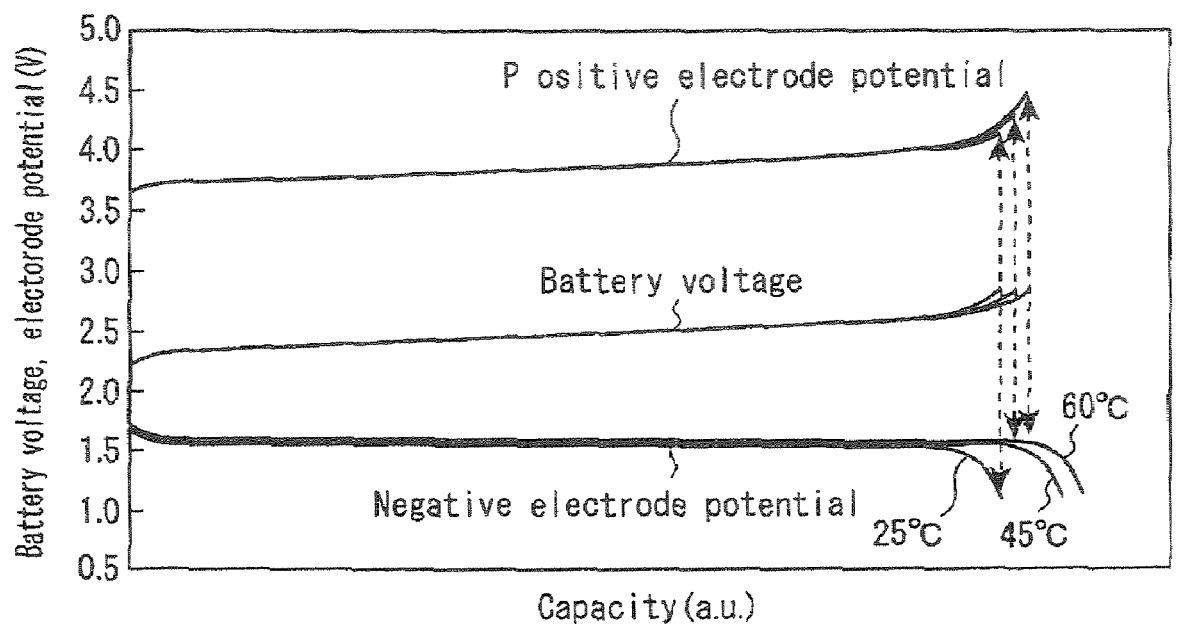
FIG. 17 is a graph showing the dependence on temperature of the charge-discharge curves of the positive electrode potential, the negative electrode potential and the battery voltage, covering the case where the ratio X of the available electric capacity of the negative electrode to the available electric capacity of the positive electrode is below 1.25.

As shown in FIG. 17, the charge-discharge curve of the negative electrode potential is shifted in a direction in which the available electric capacity is increased in accordance with the temperature elevation in the last period of the charging. On the other hand, the dependence on temperature is scarcely recognized in the charge-discharge curve of the positive electrode potential.

As a result, the positive electrode and the negative electrode are equal to each other in the available electric capacity under a temperature environment of 25° C. On the other hand, the available electric capacity of the negative electrode is larger than that of the positive electrode under a temperature environment of 60° C. In other words, when it comes to the charge-discharge curve under a temperature environment of 25° C., the negative electrode potential is rapidly lowered before the positive electrode potential is rapidly elevated. On the other hand, when it comes to the charge-discharge curve under a temperature environment of 45° C. and 60° C., the negative electrode potential is rapidly lowered after the positive electrode potential is rapidly elevated.

Such being the situation, the battery voltage under a 100%-charged state assumes a constant voltage of 2.8 V. It follows that the change in the battery voltage in the last period of the charging under a temperature environment of 25° C. is greatly dependent on the drop of the negative electrode potential, that is, regulated by negative electrode. On the other hand, the change in the battery voltage in the last period of the charging under a temperature environment of 45° C. and 60° C. is greatly dependent on the elevation of the positive electrode potential, that is, regulated by positive electrode.

The regulation by the negative electrode will now be described. When it comes to the charge-discharge curve of the negative electrode containing the spinel type lithium-titanium composite oxide, the change in potential is large in the last period of the charging and in the last period of the discharging. As a result, the change in the battery voltage in the last period of the charging becomes large in the case of the regulation by the negative electrode. On the other hand, the capacities of the unit cells constituting the battery module are somewhat nonuniform, with the result that the unit cells also become nonuniform in the battery voltage. If the spinel type lithium-titanium composite oxide is used in the negative electrode of the unit cell, the difference in the battery voltage derived from the nonuniformity in the capacity of the unit cells is increased in the last period of the charging. As a result, some of the unit cells is over-charged regardless of the situation that the charging capacity is the same to impair the charge-discharge cycle life.

On the other hand, under a temperature environment of 45° C. and 60° C., the change in the battery voltage in the last period of the charging is substantially dependent on the change in the positive electrode potential. However, since the negative electrode potential is elevated in the last period of the charging, the positive electrode potential is elevated to reach an over-charged region with elevation of the negative electrode potential. It follows that the crystal structure of the positive electrode active material is changed, and the nonaqueous electrolyte is decomposed by oxidization to cause the charge-discharge cycle characteristics to deteriorate.

To be more specific, FIG. 17 shows that, under a 100%-charged state, the negative electrode potential is set at 1.30 V and the positive electrode potential is set at 4.10 V under a temperature environment of 25° C., the negative electrode potential is set at 1.50 V and the positive electrode potential is set at 4.30 V under a temperature environment of 45° C., and the negative electrode potential is set at 1.55 V and the positive electrode potential is set at 4.35 V under a temperature environment of 60° C.

As pointed out above, the positive electrode potential under a 100%-charged state is increased with elevation of the temperature to reach an over-charged state. As a result, the change in the crystal structure of the positive electrode active material and the decomposition of the nonaqueous electrolyte by oxidation are brought about to cause the charge-discharge cycle characteristics to deteriorate.

As described above, the increase in the available electric capacity of the negative electrode accompanying the temperature elevation is larger than that of the positive electrode. It should be noted in this connection that the ionic conductivity of the spinel type lithium-titanium composite oxide is much lower than that of the carbonaceous material used as a negative electrode active material or the lithium-cobalt composite oxide, e.g., $LiCoO_2$, used as the positive electrode active material. To be more specific, the ionic conductivity of the spinel type lithium-titanium composite oxide is about one-hundredth or less of that of the carbonaceous material or the lithium-cobalt composite oxide noted above.

It should be noted that the ionic conductivity, which is increased with elevation of the temperature, is not proportional to the temperature elevation. To be more specific, within the range of 25 to 60° C., the elevation of the ionic conductivity per unit degree of temperature elevation is large around the ionic conductivity exhibited by the spinel type lithium-titanium composite oxide. On the other hand, within the range of 25 to 60° C., the elevation of the ionic conductivity per unit degree of temperature elevation is small around the ionic conductivity exhibited by the carbonaceous material or the lithium-cobalt composite oxide.

In general, the impedance of the electrode itself is rendered small with increase in the ionic conductivity. Such being the situation, the ionic conductivity of the spinel type lithium-titanium composite oxide is markedly increased with the temperature elevation and the impedance of the negative electrode itself is diminished. As a result, the polarization of the negative electrode is diminished to increase the available electric capacity.

Each embodiment will now be described with reference to the accompanying drawings. In the following description, the overlapping explanation is omitted. The accompanying drawings are schematic drawings that are simply intended to facilitate the description and understanding of the present invention. Of course, it is possible for the shape, size, ratio, etc., shown in the drawings to differ from those of the actual apparatus. It is possible to change appropriately the design of the apparatus in view of the description given below and the known technologies.

First Embodiment

The construction as an example of a nonaqueous electrolyte battery according to a first embodiment will now be described with reference to FIGS. 1A and 1B. Specifically, FIG. 1A is a cross-sectional view schematically showing the construction of a flattened nonaqueous electrolyte battery, and FIG. 1B is cross-sectional view showing in a magnified fashion the construction of a circular region A shown in FIG. 1A.

A positive electrode terminal 1 is electrically connected to a positive electrode 3, and a negative electrode terminal 2 is electrically connected to a negative electrode 4. The positive electrode 3, the negative electrode 4 and a separator 5 interposed between the positive electrode 3 and the negative electrode 4 collectively form a flattened wound electrode 6. Since the separator 5 is interposed between the positive electrode 3 and the negative electrode 4, the negative electrode 4 and the positive electrode 3 are positioned spatially apart from each other. The wound electrode 6 is housed in a case 7 having a nonaqueous electrolyte loaded therein.

Figure 1B:
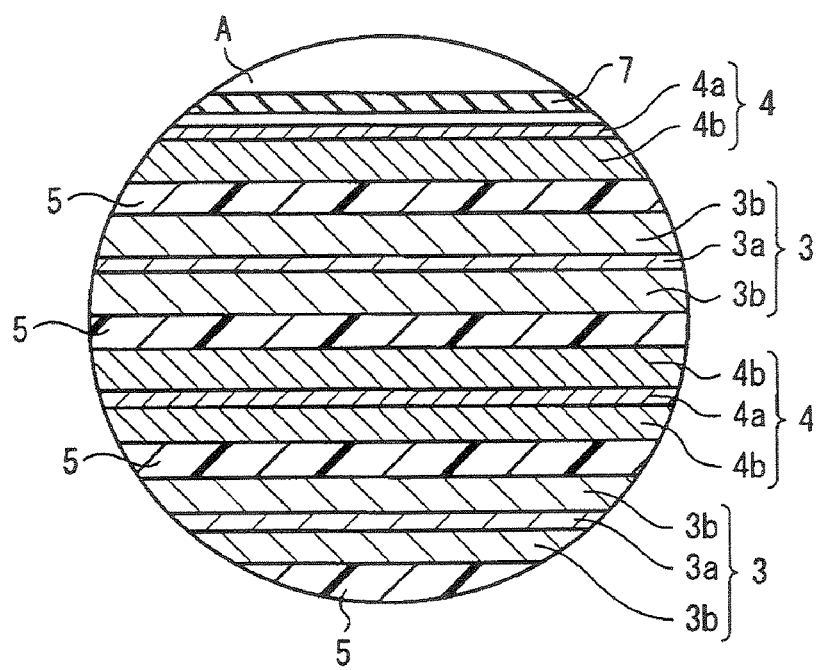
FIG. 1B is cross-sectional view showing in a magnified fashion a circular region A shown in FIG. 1A.

As shown in FIG. 1A, the flattened wound electrode 6 is housed in the case 7 having the nonaqueous electrolyte loaded therein. The negative electrode 2 is electrically connected to the outside and the positive electrode terminal 1 is electrically connected to the inside in the vicinity of the outer circumferential edge of the wound electrode 6. The wound electrode 6 has a laminate structure comprising the negative electrode 4, the separator 5, the positive electrode 3 and the separator 5, which are laminated one upon the other in the order mentioned, though the laminate structure is not shown in FIG. 1A.

The constitution of the wound electrode 6 is described in more detail. As shown in FIG. 1B, the positive electrode 3 is provided with a positive electrode current collector $3a$ and a positive electrode layer $3b$ formed on one or both faces of the positive electrode current collector $3a$. A positive electrode terminal 1 is led from the positive electrode current collector $3a$. On the other hand, the negative electrode 4 is provided with a negative electrode current collector $4a$ and a negative electrode layer $4b$ formed on one or both faces of the negative electrode current collector $4a$. A negative electrode terminal 2 is led from the negative electrode current collector $4a$. The positive electrode terminal 1 and the negative electrode terminal 2 are led outside from the same side of the case 7, and the leading direction of the positive electrode terminal 1 and the leading direction of the negative electrode terminal 2 are parallel to each other.

The negative electrode, the positive electrode, the nonaqueous electrolyte, the separator, the case, the positive electrode terminal and the negative electrode terminal will now be described in detail.

1) Negative Electrode

The available electric capacity of the negative electrode at 25° C. is larger than that of the positive electrode. The ratio X of the available electric capacity of the negative electrode at 25° C. to the available electric capacity of the positive electrode at 25° C. satisfies the condition $1.25 \leq X$. X means an available electric capacity ratio represented by (B/A). A means an available electric capacity (mAh) at 25° C. per $cm^2$ of the above positive electrode; and B means an available electric capacity (mAh) at 25° C. per $cm^2$ of the above negative electrode.

The available electric capacity of the positive electrode means the electric capacity thereof as determined as follows: the device is charged for 10 hours in a mode of constant current-constant voltage charging at a current of 0.2 C and at a potential to a lithium metal of 4.25 V, and then it is subjected to constant current discharging at a current of 0.2 C until its potential to a lithium metal reaches 3.5 V. The available electric capacity of the positive electrode in an environment at 25° C. means the electric capacity thereof measured in an environment at 25° C. according to the charge-discharge cycle under the condition as above.

The available electric capacity of the negative electrode means the electric capacity thereof as determined as follows: The device is charged for 10 hours in a mode of constant current-constant voltage charging at a current of 0.2 C and at a potential to a lithium metal of 0.4 V, and then it is subjected to constant current discharging at a current of 0.2 C until its potential to a lithium metal reaches 2.0 V. The available electric capacity of the positive electrode in an environment at 25° C. means the electric capacity thereof measured in an environment at 25° C. according to the charge-discharge cycle under the condition as above.

1 C, as referred to herein, means a current value necessary for complete discharge of a nonaqueous electrolyte battery within 1 hour. For convenience sake, a numeral value of the nominal capacity of a nonaqueous electrolyte battery may be substituted with a current value of 1 C.

The available electric capacity A per unit area of the positive electrode at 25° C. is calculated by dividing the available electric capacity of the positive electrode at 25° C. by the area of the positive electrode. Likewise, the available electric capacity B per unit area of the negative electrode at 25° C. is calculated by dividing the available electric capacity of the negative electrode at 25° C. by the area of the negative electrode. The value obtained by dividing the available electric capacity B by the available electric capacity A, (B/A), denotes the ratio X of the available electric capacity of the negative electrode at 25° C. to the available electric capacity of the positive electrode at 25° C. Incidentally, where positive electrode layers are formed on both surfaces of a positive electrode current collector, the sum of the areas of the positive electrode layers formed on both surfaces of the positive electrode current collector is used as the area of the positive electrode. This is also the case with the negative electrode.

If the available electric capacity ratio X is set at 1.25 or more, the voltage flat portion (plateau region) of the charge-discharge curve of the negative electrode can be expanded to reach the last period of the charge-discharge operation, with the result that the negative electrode potential at the last period of the charge-discharge operation is left unchanged and is kept constant even if the charge-discharge curve of the negative electrode is shifted by the temperature elevation. As a result, the change in the battery voltage at the last period of the charging is greatly dependent on the elevation of the positive electrode potential under any environment of temperature. In other words, the change in the battery voltage in the last period of the charging is regulated by the positive electrode. It follows that it is possible to prevent the positive electrode potential from reaching an over-charged state in the last period of the charging operation.

It should also be noted that, since the change in the positive electrode potential in the last period of the charge-discharge operation is small, compared with the change in the negative electrode potential in the last period of the charge-discharge operation, it is possible to diminish the change in the battery voltage in the last period of the charge-discharge operation under the regulation by the positive electrode. It follows that it is possible to suppress the expansion in the difference in the battery voltage among the individual unit cells at the last period of the charge-discharge operation in the battery pack, to make it possible to avoid the difficulty that some of the unit cells are over-charged or over-discharged.

When the available electric capacity ratio X is larger, then it is more advantageous for improving the cycle characteristics as high temperatures of 60° C.; but when it is more than 2, then the battery capacity insufficiency may be remarkable owing to the excessive negative electrode capacity not participating in charge-discharge cycles. When X is at most 2.0, then too much reduction in the negative electrode utility may be evaded and the battery capacity reduction may be inhibited. From these results, the available electric capacity ratio X is preferably within a range of $1.25 \leqq X \leqq 2$, for providing a nonaqueous electrolyte battery having excellent cycle characteristics within a broad temperature range of from a room temperature environment to a high temperature environment.

More preferably, X is $1.25 \leqq X \leqq 1.50$. When X is at most 1.50, then the battery capacity reduction may be evaded, and the impedance increase owing to the increase in the thickness of the negative electrode may be inhibited.

The negative electrode comprises a negative electrode current collector and a negative electrode layer formed on one surface or both surfaces of the negative electrode current collector. The negative electrode layer contains a negative electrode active material, a negative electrode conductive agent and a binder.

The spinel type lithium-titanium composite oxide is used as the negative electrode active material. The spinel type lithium-titanium composite oxide includes, for example, lithium-titanium oxide having a spinel structure. The lithium-titanium oxide can be represented by the chemical formula $Li_{4+x}Ti_5O_{12}(0 \leqq x \leqq 3)$.

It is desirable for the negative electrode active material to have an average particle diameter not larger than 1 μm. In the case of using a negative electrode active material having an average particle diameter not larger than 1 μm, it is possible to improve the charge-discharge cycle performance of the nonaqueous electrolyte battery. Particularly, the produced effect is made prominent in the rapid charging stage and the high rate charging stage. It should be noted, however, that, if the average particle diameter is excessively small, the nonaqueous electrolyte tends to be excessively distributed on the negative electrode to bring about depletion of the nonaqueous electrolyte on the positive electrode. Such being the situation, it is desirable for the lower limit of the average particle diameter of the negative electrode active material to be set at 0.001 μm.

The average particle diameter of the lithium-titanium composite oxide powder was measured as follows.

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, to analyze the particle size distribution data.

Figure 16:
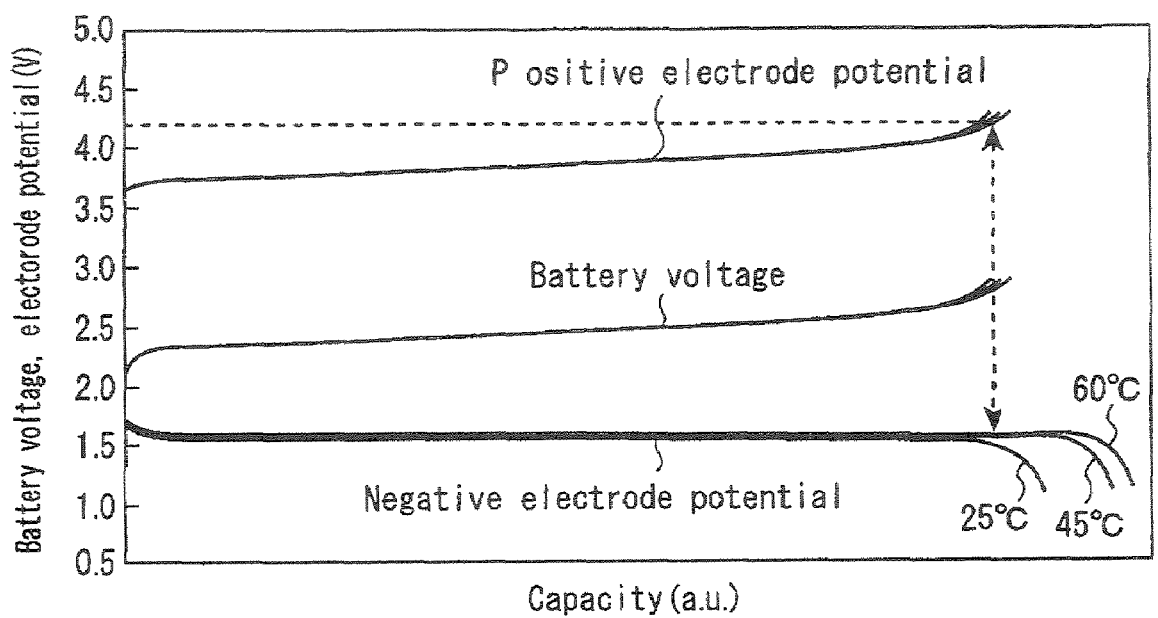
FIG. 16 is a graph showing the dependence on temperature of the charge-discharge curves of the positive electrode potential, the negative electrode potential and the battery voltage, covering the case where the ratio X of the available electric capacity of the negative electrode to the available electric capacity of the positive electrode is 1.25 and above.

As shown in FIG. 16, the spinel type lithium-titanium composite oxide exhibits a high flatness of the charge-discharge curve except the last period of the charge-discharge operation. To be more specific, the change in the electrode potential within a range of 10% to 90% of the available electric capacity is about 0.05 V under a temperature environment of 25° C.

Therefore, if the available electric capacity of the negative electrode at 25° C. is set to fall within a range of 1.25 to 2.0 times as large as that of the positive electrode, the negative electrode potential under a 100%-charged state is not dependent on the temperature even if the charge-discharge curve is shifted in accordance with the temperature. It follows that the positive electrode potential can be controlled easily at the last period of the charging to make it possible to avoid easily the over-charged state. Also, the spinel type lithium-titanium composite oxide is small in expansion/shrinkage of the crystal lattice caused by the insertion-release reaction of lithium ions accompanying the charge-discharge operation of the battery, with the result that the battery becomes excellent in the charge-discharge cycle characteristics.

On the other hand, the ramsdellite type lithium-titanium composite oxide depicts a charge-discharge curve that is moderately lowered in accordance with the charge-discharge operation of the battery. Therefore, the negative electrode potential under a 100%-charged state is enhanced when the charge-discharge curve is shifted in accordance with the change in the temperature environment even if the available electric capacity of the negative electrode is made larger than that of the positive electrode. It follows that the positive electrode potential under a 100%-charged state is also enhanced to cause an over-charged state.

It is desirable for the negative electrode active material to have an average particle diameter not larger than 1 μm and a specific surface area of 5 to 50 $m^2/g$ as determined by the BET method utilizing the $N_2$ adsorption. Where the requirements described above are satisfied, it is possible to permit the negative electrode active material to be impregnated with the nonaqueous electrolyte efficiently.

The negative electrode conductive agent for enhancing the current collecting performance and for suppressing the contact resistance relative to the current collector includes, for example, acetylene black, carbon black and graphite.

The binder for bonding the negative electrode active material to the negative electrode conductive agent includes, for example, polytetrafluoroethylene (PTFE), polyvinylidene fluoride (PVdF), a fluorinated rubber and styrene-butadiene rubber.

Concerning the mixing ratio of the negative electrode active material, the negative electrode conductive agent, and the binder, it is desirable for the negative electrode active material to be used in an amount not smaller than 70% by weight and not larger than 96% by weight, for the negative electrode conductive agent to be used in an amount not smaller than 2% by weight and not larger than 28% by weight, and for the binder to be used in an amount not smaller than 2% by weight and not larger than 28% by weight. If the amount of the negative electrode conductive agent is not smaller than 2% by weight, it is possible for the current collecting performance of the negative electrode layer to be increased, with the result that the large current characteristics of the nonaqueous electrolyte battery tend to be increased. Also, if the amount of the binder is not smaller than 2% by weight, the bonding strength between the negative electrode layer and the negative electrode current collector is increased, with the result that the charge-discharge cycle characteristics of the nonaqueous electrolyte battery tend to be increased. On the other hand, it is desirable for the amount of each of the negative electrode conductive agent and the binder to be not larger than 28% by weight in view of the aspect of retaining a large capacity of the battery.

It is desirable for the negative electrode current collector to be formed of a material that is electrochemically stable within a potential range higher than 1.0 V. The material includes, for example, an aluminum foil and an aluminum alloy foil containing at least one element selected from the group consisting of Mg, Ti, Zn, Mn, Fe, Cu and Si.

It is desirable for the aluminum foil and the aluminum alloy foil to have an average crystal grain size not larger than 50 μm. In this case, the mechanical strength of the current collector can be drastically increased to make it possible to increase the density of the negative electrode by applying high pressure pressing to the negative electrode. As a result, the battery capacity can be increased. Also, since it is possible to prevent the dissolution and corrosion deterioration of the negative electrode current collector over a long over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery. It is more desirable for the average crystal grain size of the negative electrode current collector to be not larger than 30 μm, furthermore desirably, not larger than 5 μm.

The average crystal grain size can be obtained as follows. Specifically, the texture of the current collector surface is observed with an electron microscope to obtain the number n of crystal grains present within an area of 1 mm×1 mm. Then, the average crystal grain area S is obtained from the formula "$S=1\times10^6/n$ (μm$^2$)", where n denotes the number of crystal grains noted above. Further, the average crystal grain size d (μm) is calculated from the area S by formula (4) given below:

$$d=2(S/\pi)1/2 \qquad (4)$$

The aluminum foil or the aluminum alloy foil having the average crystal grain size not larger than 50 μm can be affected in a complicated manner by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%. Where the nonaqueous electrolyte battery is mounted on a vehicle, it is particularly desirable to use an aluminum alloy foil for forming the negative electrode current collector.

The negative electrode can be prepared by, for example, coating the negative electrode current collector with a slurry prepared by suspending a negative electrode active material, a negative electrode conductive agent and a binder in a general purpose solvent, followed by drying the coated suspension to form a negative electrode layer and subsequently pressing the negative electrode current collector having the negative electrode layer formed thereon. It is also possible to form a mixture of a negative electrode active material, a negative electrode conductive agent and a binder into the shape of pellets. Naturally, the pellets thus formed are used for forming the negative electrode layer.

2) Positive Electrode

The positive electrode comprises a positive electrode current collector and a positive electrode layer supported on one surface or both surfaces of the positive electrode current collector. The positive electrode layer contains a positive electrode active material, a positive electrode conductive agent and a binder.

A lithium-transition metal oxide having a layered crystal structure (a layered type lithium-transition metal oxide) is used as the positive electrode active material.

The lithium-transition metal oxide is a metal oxide in which a metal component contains lithium and at least one transition metal element. It is desirable for the lithium-transition metal oxide to have a function of absorption and release of lithium or lithium ions.

In general, the lithium-transition metal oxide having a layered crystal structure exhibits a high ionic conductivity. As a result, the increase in the available electric capacity of the positive electrode accompanying the temperature elevation is smaller than that of the negative electrode. Incidentally, the temperature environment of the temperature elevation is supposed under room temperature to high temperature.

It is desirable to use as the lithium-transition metal oxide having a layered crystal structure at least one oxide selected from the group consisting of a lithium-cobalt composite oxide, a lithium-nickel composite oxide and a lithium-manganese composite oxide because these composite oxides exhibit a high average operating voltage for the charge-discharge operation of the battery.

To be more specific, the lithium-transition metal oxide includes, for example, a lithium-cobalt composite oxide (e.g., $Li_xCoO_2$), a lithium-manganese composite oxide (e.g., $Li_xMnO_2$), a lithium-nickel composite oxide (e.g., $Li_xNiO_2$), a lithium-nickel-cobalt composite oxide (e.g., $LiNi_{1-y}Co_yO_2$), a lithium-manganese-cobalt composite oxide (e.g., $LiMn_yCo_{1-y}O_2$), and a lithium-nickel-cobalt-manganese composite oxide (e.g., $LiNi_xCo_yMn_{1-x-y}O_2$) It is desirable for each of the molar ratios x and y in the chemical formulas given above to be 0 to 1.

Oxides having a layered crystal structure (hereinafter referred to as "layered-crystal oxide") such as $Li_xCoO_2$ and $Li_xNiO_2$ are more desirable than the spinel type lithium-manganese composite oxide. The reasons for the oxides to be more desirable are as follows.

In the spinel type lithium-manganese composite oxide, e.g., $Li_xMn_2O_4$, the charge-discharge operation is repeated with the molar ratio x of Li held within a range satisfying $0 \leq x \leq 1$. Where the lithium molar ratio x is held within a range of 0 to 1, the composite oxide has a stable chemical structure. Accordingly, even when the positive electrode is at an over-charged potential, the lithium molar ratio is not smaller than 0, and its structure is kept stable, and naturally, therefore, the charge-discharge cycle degradation in over-charging is small. If the layered-crystal oxide represented by $Li_xCoO_2$ is charged to permit the lithium molar ratio x to satisfy $0 \leq x < 0.5$, the crystal structure is changed to markedly lower the reversibility. It follows that in order to maintain the charge-discharge cycle performance in such a layered-crystal oxide, it is desirable to control the charge-discharge operation such that the molar ratio x falls within a range satisfying $0.5 \leq x \leq 1$. If the molar ratio x is smaller than 0.5 even if slightly, the crystal structure of $Li_xCoO_2$ is changed from the hexagonal system into the monoclinic system. There is some possibility of breaking down positive electrode active material particle caused by this crystal structure change. On the other hand, in view of the increase in the capacity, it is desirable for the composite oxide to be fully charged, i.e., to be charged until the molar ratio x is changed to 0.5. In order to satisfy both of these requirements simultaneously, it is desirable to control the charge-discharge operation in a manner to change the molar ratio x from 0.5 to 1. In the nonaqueous electrolyte battery according to first embodiment, it is difficult for the positive electrode to be charged to reach an overcharged state and, thus, the molar ratio x of lithium can be controlled easily to realize a stable charge-discharge cycle performance.

Similarly, in the case of $Li_xNiO_2$, the crystal structure is changed if the battery is charged to cause the lithium molar ratio x to be made smaller than 0.3. Such being the situation, it is desirable to control the charge-discharge operation such that the molar ratio x is changed in this case from 1 toward 0.3. In the nonaqueous electrolyte battery according to the first embodiment, it is possible to control the over-charging of the positive electrode to make it possible to control easily the molar ratio x of lithium to satisfy $0.3 \leq x \leq 1$, thereby realizing satisfactory charge-discharge cycle characteristics.

Incidentally, the upper limit of the charging potential of the positive electrode that contains a layered-crystal oxide such as $Li_xCoO_2$ or $Li_xNiO_2$ is about 4.25 V, if the upper limit of the charging potential of the positive electrode is controlled to the lower limit of the range of the molar ratio x described above.

The layered crystal structure includes, for example, a layered halite type structure.

The layered type lithium-transition metal oxide can be represented by the structural formula of $Li_yM1_{z1}M2_{z2}O_2$, where M1 denotes at least one element selected from the group consisting of Co, Ni, and Mn, M2 denotes at least one element selected from the group consisting of Fe, Al, B, Ga and Nb, and $0<y \leq 1.2$, $0.98 \leq z1+z2 \leq 1.2$, $0 \leq z2 < 0.2$. It is desirable for the mole amount of Ni to be not larger than 0.85 (including 0.0) based on the sum of the mole amount of M1 and M2. The sum of the mole amount of M1 and M2 is supposed to be 1. In this case, M1 consists of Ni, or consists of Ni and at least one element selected from Co and Mn.

M1 is selected from the group consisting of Co, Ni and Mn as described above.

M2, which is an element partly substituting M1, is added appropriately in accordance with the desired properties of the nonaqueous electrolyte battery. It is desirable for the substituting element to be selected from the group consisting of Fe, Al, B, Ga and Nb. It is particularly desirable to use Al as the substituting element because Al permits decreasing the film resistance at the interface between the positive electrode and the liquid nonaqueous electrolyte to stabilize the crystal structure of the active material.

The layered type lithium-transition metal oxide, in which the molar ratios y, z1 and z2 fall within the ranges given above, is particularly excellent in the charge-discharge cycle characteristics.

As described above, it is desirable for the Ni amount to be not larger than 0.85 (including 0.0) based on the sum of M1 and M2. It should be noted that each of the layered type lithium-cobalt composite oxide and the layered type lithium-manganese composite oxide exhibits an ionic conductivity about 100 times as high as that of the spinel type lithium-titanium composite oxide. Also, the dependence of the available electric capacity on temperature is small in the layered type lithium-cobalt composite oxide and the layered type lithium-manganese composite oxide. It follows that the particular effect described above, which is inherent in this embodiment, is produced prominently in the case of using the layered type lithium-cobalt composite oxide and the layered type lithium-manganese composite oxide. On the other hand, the layered type lithium-nickel composite oxide is somewhat inferior in its ionic conductivity to the layered type lithium-cobalt composite oxide and the layered type lithium-manganese composite oxide.

It follows that, where at least one element selected from the group consisting of Co, Ni and Mn is selected as the main transition metal, the ionic conductivity is lowered with increase in the Ni amount to increase the dependence on temperature of the available electric capacity. The temperature dependence of the available electric capacity of the positive electrode using a lithium-nickel composite oxide is not larger than that of the negative electrode using the spinel type lithium-titanium composite oxide. However, it is not better to increase the Ni amount. Such being the situation, it is desirable for the Ni amount to be not larger than 0.85 based on the sum of M1 and M2.

It should also be noted that the lithium-transition metal oxide represented by $Li_yM1_{z1}M2_{z2}O_2$ belongs to a layered-crystal oxide. Therefore, if the lithium-transition metal oxide is used in the nonaqueous electrolyte battery according to this embodiment, the deterioration caused by the over-charging is avoided to realize good charge-discharge cycle characteristics.

The positive electrode conductive agent for enhancing the current collecting performance and for suppressing the contact resistance relative to the current collector, includes, for example, a carbonaceous material such as acetylene black, carbon black and graphite.

The binder for bonding the positive electrode active material to the positive electrode conductive agent includes, for example, polytetrafluoroethylene (PTFE), polyvinylidene fluoride (PVdF), and a fluorinated rubber.

Concerning the mixing ratio of the positive electrode active material, the positive electrode conductive agent and the binder, it is desirable for the positive electrode active material to be used in an amount not smaller than 80% by weight and not larger than 95% by weight, for the positive electrode conductive agent to be used in an amount not smaller than 3% by weight and not larger than 18% by weight, and for the binder to be used in an amount not smaller than 2% by weight and not larger than 17% by weight. If the mixing amount of the positive electrode conductive agent is not smaller than 3% by weight, it is possible to obtain the effect described above. Also, if the mixing amount of the positive electrode conductive agent is not larger than 18% by weight, it is possible to suppress the decomposition of the nonaqueous electrolyte on the surface of the positive electrode conductive agent during storage of the battery pack under a high temperature. Further, if the mixing amount of the binder is not smaller than 2% by weight, it is possible to obtain a sufficient electrode strength. Also, if the mixing amount of the binder is not larger than 17% by weight, it is possible to decrease the mixing amount of an insulator in the electrode to decrease the internal resistance of the battery.

It is desirable for the positive electrode current collector to be formed of an aluminum foil or an aluminum alloy foil containing at least one element selected from the group consisting of Mg, Ti, Zn, Mn, Fe, Cu and Si.

It is desirable for the aluminum foil and the aluminum alloy foil to have an average crystal grain size not larger than 50 μm. In this case, the mechanical strength of the current collector can be drastically increased to make it possible to increase the density of the positive electrode by applying high pressure pressing to the positive electrode. As a result, the battery capacity can be increased. It is more desirable for the average crystal grain size of the negative electrode current collector to be not larger than 30 μm, furthermore desirably, not larger than 5 μm.

It is desirable for the aluminum foil or the aluminum alloy foil to have a thickness not larger than 20 μm, preferably not larger than 15 μm.

The positive electrode can be prepared by, for example, coating a positive electrode current collector with a suspension prepared by suspending a positive electrode active material, a positive electrode conductive agent and a binder in a suitable solvent, followed by drying the coated suspension to form a positive electrode layer on the positive electrode current collector and subsequently pressing the positive electrode current collector having the positive electrode layer formed thereon. It is also possible to form a mixture of a positive electrode active material, a positive electrode conductive agent and a binder into the shape of pellets. In this case, the pellets thus formed is used for forming the positive electrode layer.

3) Nonaqueous Electrolyte

The nonaqueous electrolyte includes a liquid nonaqueous electrolyte prepared by dissolving an electrolyte in an organic solvent and a gel-like composite nonaqueous electrolyte prepared by adding a polymer material to a liquid nonaqueous electrolyte.

The liquid nonaqueous electrolyte can be prepared by dissolving an electrolyte in an organic solvent in a concentration of 0.5 to 2.5 mol/L.

The electrolyte includes, for example, lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bis-trifluoromethyl sulfonyl imide lithium [$LiN(CF_3SO_2)_2$], and a mixture thereof. It is desirable for the electrolyte to be unlikely to be oxidized even under a high potential. It is most desirable to use $LiPF_6$ as the electrolyte.

The organic solvent includes, for example, cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2Me THF), and dioxolane (DOX); linear ethers such as dimethoxy ethane (DME), and diethoxy ethane (DEE); as well as γ-butyrolactone (GBL), acetonitrile (AN) and sulfolane (SL). These organic solvents can be used singly or in the form of a mixture of a plurality of these organic solvents.

It is particularly desirable to use a mixed solvent containing at least two of the organic solvents selected from the group consisting of propylene carbonate (PC), ethylene carbonate (EC) and γ-butyrolactone (GBL).

The polymer material for preparing the gel-like composite nonaqueous electrolyte includes, for example, polyvinylidene fluoride (PVdF), polyacrylonitrile (PAN), and polyethylene oxide (PEO).

It is also possible to use a room temperature molten salt (ionic liquid) containing lithium ions, a polymer solid electrolyte, or an inorganic solid electrolyte as the nonaqueous electrolyte.

The room temperature molten salt (ionic liquid) denotes a compound, which can be present in the form of a liquid material under room temperature (e.g., 15° C. to 25° C.) and which contains an organic cation and an organic anion. The room temperature molten salt (ionic liquid) noted above includes, for example, a molten salt that can be present in the form of a liquid material, a molten salt that can be converted into a liquid material when mixed with an electrolyte, and a molten salt that can be converted into a liquid material when dissolved in an organic solvent. Incidentally, it is desirable for the room temperature molten salt to have a melting point not higher than 25° C. Also, it is desirable for the organic cation forming the molten salt to have a quaternary ammonium skeleton.

The polymer solid electrolyte can be prepared by dissolving an electrolyte in a polymer material, followed by solidifying the resultant solution.

Further, the inorganic solid electrolyte is a solid material exhibiting a lithium ion conductivity.

4) Separator

The separator includes, for example, a porous film including polyethylene, polypropylene, cellulose and/or polyvinylidene fluoride (PVdF), and an unwoven fabric made of a synthetic resin. Particularly, it is desirable in view of the improvement in safety to use a porous film made of polyethylene or polypropylene because the particular porous film can be melted under a prescribed temperature to break the current.

5) Case

The case is formed of a laminate film having a thickness of, for example, 0.5 mm or less, or a metal sheet having a thickness of, for example, 0.5 mm or less. It is more desirable for these cases to have a thickness of 0.2 mm or less.

Also, the case has a flattened shape, an angular shape, a cylindrical shape, a coin shape, a button shape or a sheet shape, or is of a laminate type. The case includes a case of a large battery mounted on, for example, an electric vehicle having two to four wheels in addition to a small battery mounted on a portable electronic device.

The laminate film includes, for example, a multi-layered film including a metal layer and a resin layer covering the metal layer. For decreasing the weight of the battery, it is desirable for the metal layer included in the multi-layered film to be formed of an aluminum foil or an aluminum alloy foil. On the other hand, the resin layer for reinforcing the metal layer is formed of a polymer material such as polypropylene (PP), polyethylene (PE), Nylon, and polyethylene terephthalate (PET). The laminate film case can be obtained by bonding the periphery of superposed laminate films by thermal fusion.

It is desirable for the metal case to be formed of aluminum or an aluminum alloy. Also, it is desirable for the aluminum alloy to be an alloy containing an element such as magnesium, zinc or silicon. On the other hand, it is desirable for the amount of the transition metals, which are contained in the aluminum alloy, such as iron, copper, nickel and chromium, to be not larger than 100 ppm.

6) Positive Electrode Terminal

The positive electrode terminal is formed of a material exhibiting an electrical stability and conductivity within the range of 3.0 to 4.25 V of the potential relative to the lithium metal. To be more specific, the material used for forming the positive electrode terminal includes, for example, aluminum and an aluminum alloy containing at least one element selected from the group consisting of Mg, Ti, Zn, Mn, Fe, Cu and Si. In order to lower the contact resistance relative to the positive electrode current collector, it is desirable for the positive electrode terminal to be formed of a material equal to the material used for forming the positive electrode current collector.

7) Negative Electrode Terminal

The negative electrode terminal is formed of a material exhibiting an electrical stability and conductivity within the range of 1.0 to 3.0 V of the potential relative to the lithium metal. To be more specific, the material used for forming the negative electrode terminal includes, for example, aluminum and an aluminum alloy containing at least one element selected from the group consisting of Mg, Ti, Zn, Mn, Fe, Cu and Si. In order to lower the contact resistance relative to the negative electrode current collector, it is desirable for the negative electrode terminal to be formed of a material equal to the material used for forming the negative electrode current collector.

Figure 2:
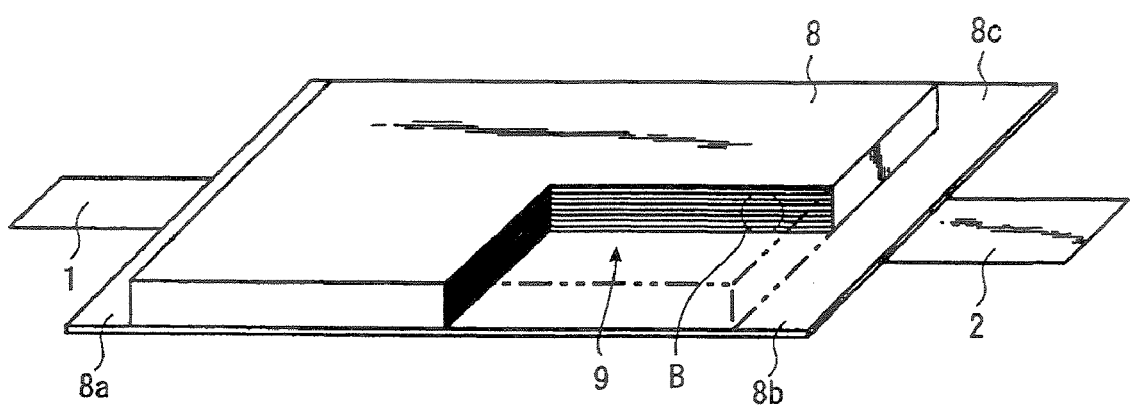
FIG. 2 is an oblique view, partly broken away, schematically showing as another example the construction of a nonaqueous electrolyte battery according to a first embodiment.

The nonaqueous electrolyte battery is not limited to the flattened type nonaqueous electrolyte battery of the type shown in FIG. 1. It is also possible to use, for example, the flattened type nonaqueous electrolyte battery shown in FIGS. 2 and 3. FIG. 2 is an oblique view, partly broken away, schematically showing the construction of another example of the nonaqueous electrolyte battery according to the first embodiment, and FIG. 3 is a cross-sectional view showing in a magnified fashion the circular portion B shown in FIG. 2.

As shown in FIG. 2, a laminate type electrode group 9 is housed in a case 8 formed of a laminate film. The case 8 has a first sealing section 8a formed at one edge of a peripheral portion, a second sealing section 8b formed at an edge portion opposed to said one edge, and a third sealing section 8c formed at an edge portion in a longitudinal direction. The first sealing section 8a, second sealing section 8b and third sealing section 8c are formed by heat sealing. As shown in FIG. 3, the laminate type electrode group 9 comprises a positive electrode 3 and a negative electrode 4, which are laminated one upon the other with a separator 5 interposed between the positive electrode 3 and the negative electrode 4. Each of a plurality of positive electrodes 3 includes a positive electrode current collector 3a and positive electrode layers 3b formed on both surfaces of the positive electrode current collector 3a and containing a positive electrode active material. Likewise, each of a plurality of negative electrodes 4 includes a negative electrode current collector 4a and negative electrode layers 4b formed on both surfaces of the negative electrode current collector 4a and containing a negative electrode active material. One side of the negative electrode current collector 4a included in each negative electrode 4 protrudes from the positive electrode 3. The negative electrode current collector 4a protruding from the positive electrode 3 is electrically connected to a band-like negative electrode terminal 2. The distal end portion of the band-like negative electrode terminal 2 is withdrawn from the second sealing section 8b of the case 8 to the outside. Also, one side of the positive electrode current collector 3a included in the positive electrode 3 is positioned on the side opposite to the protruding side of the negative electrode current collector 4a and is protruded from the negative electrode 4, though the particular construction is not shown in the drawing. The positive electrode current collector 3a protruding from the negative electrode 4 is electrically connected to a band-like positive electrode terminal 1. The distal end portion of the band-like positive electrode terminal 1 is positioned on the side opposite to the side of the negative electrode terminal 2 and is withdrawn from the first sealing section 8a of the case 8 to the outside. A direction of the positive electrode terminal 1 withdrawn from the case 8 is opposed to a direction of the negative electrode terminal 2 withdrawn from the case 8.

Figure 3:
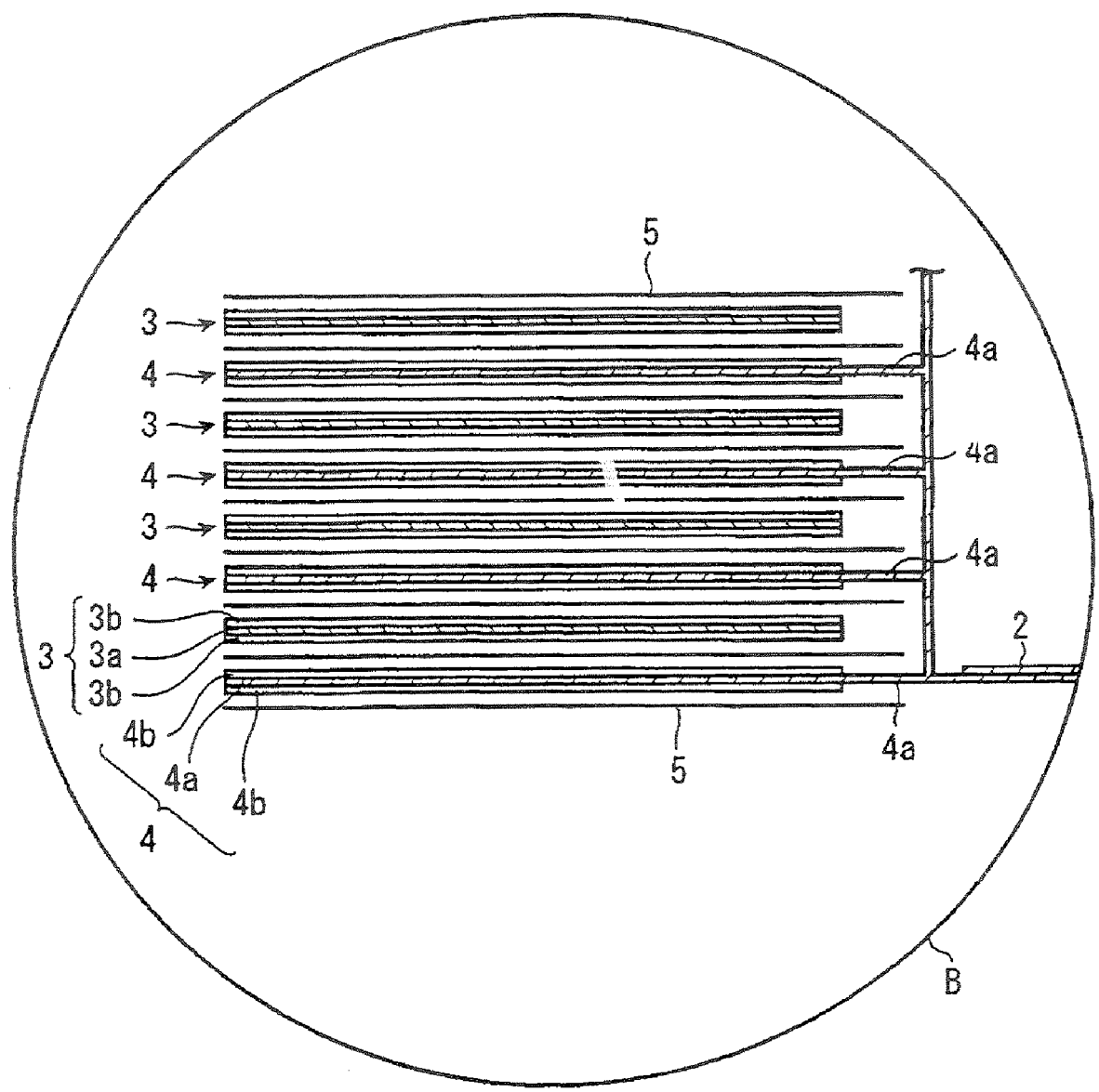
FIG. 3 is a cross-sectional view showing in a magnified fashion the construction of a circular region B shown in FIG. 2.
Figure 4:
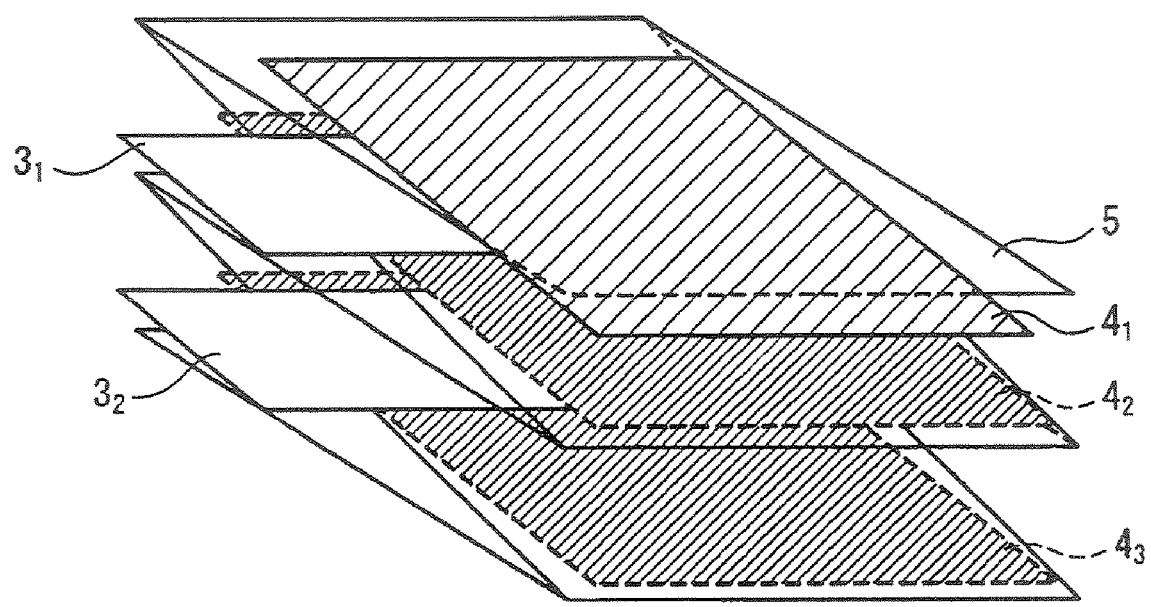
FIG. 4 is an oblique view showing a laminate type electrode group to be used in the nonaqueous electrolyte battery according to the first embodiment.

Regarding the structure of the electrode group, FIG. 1 shows a wound structure, and FIGS. 2 and 3 show a laminate structure. For satisfying excellent input-output characteristics and also high safety and reliability, the electrode group structure is preferably a laminate structure. Further, for realizing a high and large current capability even in long-term use, it is desirable that the electrode group containing a positive electrode and a negative electrode has a laminate structure, and, as in FIG. 4, a zigzag-folded separator is used. The belt-like separator 5 is zigzag-folded. A strip-like negative electrode $4_1$ is laminated as the outermost layer of the zigzag-folded separator 5. In the part where the separator 5 is zigzag-folded to overlap with each other, a strip-like positive electrode $3_1$, a strip-like negative electrode $4_2$, a strip-like positive electrode $3_2$, and a strip-like negative electrode $4_3$ are inserted in that order from the top. In that manner, the positive electrode 3 and the negative electrode 4 are alternately disposed between the zigzag-folded separator 5 to give the laminate-structured electrode group.

When the separator is zigzag-folded, then the three sides of the positive electrode and the negative electrode may be kept in direct contact with a nonaqueous electrode not interrupted by the separator, and therefore the nonaqueous electrolyte may smoothly move to the electrodes. Accordingly, even when the nonaqueous electrolyte is consumed on the surfaces of the electrodes in long-term use, the nonaqueous electrolyte may still supplied smoothly and excellent large-current characteristics (input-putout characteristics) can be realized for a long period of time. When a separator is formed like a bag even though having the same laminate structure as above, only one side of the electrode in the bag may be kept in direct contact with a nonaqueous electrolyte, and smooth supply of the nonaqueous electrolyte may be difficult. Accordingly, when the nonaqueous electrolyte is consumed on the electrode surface in long-term use, the nonaqueous electrolyte could not be smoothly supplied and with the increase in the use frequency, the large-current characteristics (input-output characteristics) may gradually worsen.

From the above, it is desirable that the electrode group containing a positive electrode and a negative electrode has a laminate structure and that the separator to spatially separate the positive electrode and the negative electrode from each other is zigzag-folded.

Second Embodiment

The battery pack according to a second embodiment comprises a plurality of nonaqueous electrolyte batteries according to the first embodiment as unit cells. These plural unit cells are electrically connected to each other in series or in parallel to form a battery module.

It is desirable for the unit cell to have a rated capacity not smaller than 2 Ah and not larger than 100 Ah. It is more desirable for the rated capacity of the unit cell to be not smaller than 3 Ah and not larger than 40 Ah. Further, it is desirable for the unit cell mounted to a hybrid electric vehicle to have a rated capacity not smaller than 3 Ah and not larger than 15 Ah and for the unit cell for an electric vehicle and an uninterruptible power supply device (UPS) to have a rated capacity not smaller than 15 Ah and not larger than 40 Ah. Incidentally, the term "rated capacity" denotes the capacity under the condition that the unit cell is discharged under a current of 0.2 C.

It suffices to use at least two unit cells for forming a battery pack. However, it is desirable to use at least 5 unit cells and not more than 500 unit cells. It is more desirable to use at least 5 unit cells and not more than 200 unit cells. Further, when it comes to the battery pack mounted on a hybrid electric vehicle or an electric vehicle, it is desirable for the battery pack to include at least 5 unit cells and not more than 200 unit cells and for the battery pack used in UPS to include at least 5 unit cells and not more than 1,000 unit cells. Also, when it comes to a battery pack mounted on a electric vehicle, it is desirable for the unit cells to be connected in series to obtain a high voltage.

The unit cell described above is adapted for use in the preparation of a battery module. Also, the battery pack according to the embodiment is excellent in the charge-discharge cycle characteristics, as described in the following.

The change in potential of the positive electrode containing a lithium-transition metal oxide that has a layered crystal structure is moderate at the last period of the charge-discharge operation, compared with that of the negative electrode containing a lithium-titanium composite oxide. In other words, a change in the electrode potential within 95% to 100% of the available electric capacity for the positive electrode is smaller than that for the negative electrode under a temperature environment of 25° C.

As described above, the change in the battery voltage in the last period of the charging operation is regulated by the positive electrode under a temperature environment not lower than room temperature. This is also the case with last period of the discharging operation. It follows that the change in the battery voltage in the last period of the charge-discharge operation becomes moderate by the positive electrode regulation for this embodiment, compared with the negative electrode regulation. It follows that it is possible to diminish the difference in the battery voltage among the individual batteries, which is derived from the difference in the battery capacity among the individual batteries, in the last period of the charge-discharge operation. The battery module, in which the difference in the battery voltage among the individual batteries is small, permits improving the charge-discharge cycle characteristics.

The particular mechanism will now be described with reference to FIGS. 5 and 6, covering as an example the change in the battery voltage in the last period of the charging operation in the battery module prepared by connecting a plurality of batteries in series.

In general, a difference in the battery capacity, which is derived from the nonuniformity in the slurry loading amount at an electrode manufacturing process, is generated among the individual batteries, though the difference in the battery capacity is also dependent on the manufacturing method of the battery.

Figure 5:
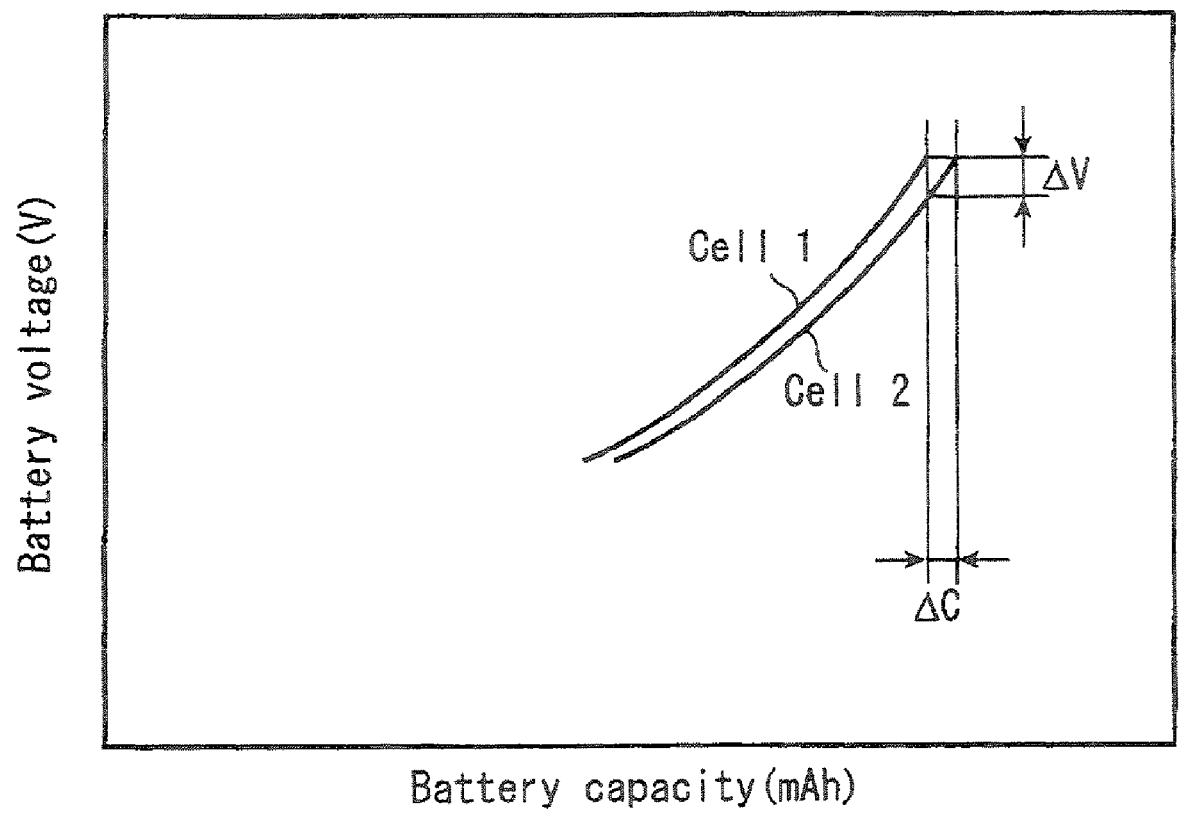
FIG. 5 is a graph showing the relationship between the battery capacity and the battery voltage in the battery module of the series connection, covering the case where the change of the battery voltage in the last period of the charging is regulated by the positive electrode.
Figure 6:
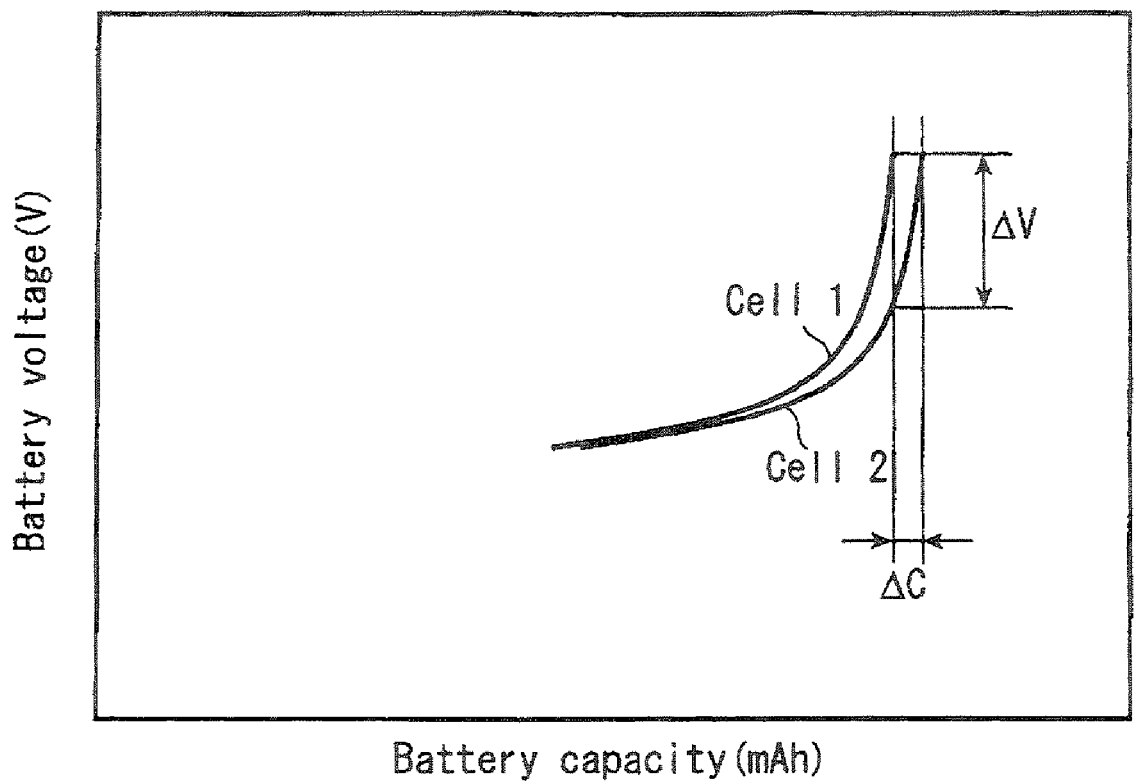
FIG. 6 is a graph showing the relationship between the battery capacity and the battery voltage in the battery module of the series connection, covering the case where the change of the battery voltage in the last period of the charging is regulated by the negative electrode.

FIGS. 5 and 6 are showing the relationship between the battery capacity and the battery voltage in the battery module having two cells, i.e., cell 1 and cell 2 of the series connection. Cell 1 and cell 2 differ from each other in the battery capacity (the difference in the battery capacity being hereinafter referred to as the nonuniformity $\Delta C$ of the capacity). Since the same current flows through cell 1 and cell 2, a difference in the battery voltage (hereinafter referred to as $\Delta V$) is derived from the nonuniformity $\Delta C$ of the capacity.

In FIG. 5, a nonaqueous electrolyte battery of the first embodiment is used as the unit cell, and therefore the voltage change at the end of charging is regulated at the positive electrode and is gentle, and the battery voltage difference ($\Delta V$) caused by capacity fluctuation ($\Delta C$) is small.

On the other hand, in FIG. 6, a unit cell having an available electric capacity ratio X of less than 1.25 is used as a battery module, and therefore the voltage change at the end of charging is regulated at the negative electrode and is steep, and the battery voltage difference ($\Delta V$) caused by capacity fluctuation ($\Delta C$) is large. When the battery voltage difference ($\Delta V$) caused by capacity fluctuation ($\Delta C$) is large, then overcharging may shorten the cycle life of the battery. In addition, the battery may be over-discharged while driven, and may finally undergo pole change whereby the battery performance may be significantly worsened.

The embodiment of the unit cell adapted for use for the manufacture of the battery module will now be described.

As described previously, the lithium-transition metal oxide used as the positive electrode active material is better for the layered oxide. Particularly, it is desirable for the layered oxide represented by the structural formula of $Li_y M1_{z1} M2_{z2} O_2$, where M1 denotes at least one element selected from the group consisting of Co, Ni, and Mn, M2 denotes at least one element selected from the group consisting of Fe, Al, B, Ga and Nb, and $0<y\leq1.2$, $0.98\leq z1+z2\leq1.2$, $0\leq z2<0.2$. It is desirable for the mole amount of Ni to be not fewer than 0.3 based on the sum of the mole amount of M1 and M2. The sum of the mole amount of M1 and M2 is supposed to be 1. In this case, M1 consists of Ni, or consists of Ni and at least one element selected from Co and Mn.

It is more desirable for the amount of Ni to be at least 0.3 based on the sum of M1 and M2. In this case, M1 denotes Ni or a combination of Ni and at least one element selected from the group consisting of Co and Mn.

If the amount of Ni is not smaller than 0.3 based on the sum of M1 and M2, it is possible to improve the flatness of the positive electrode voltage at the last period of the charge-discharge operation. In other words, it is possible to diminish the change in the positive electrode voltage in the last period of the charge-discharge operation. As a result, the difference in voltage ($\Delta V$) derived from the difference in the battery capacity (hereinafter referred to as the nonuniformity $\Delta C$ of the capacity) referred to above can be further diminished to further improve the charge-discharge cycle characteristics.

In case where a spinel-structured lithium-manganese composite oxide is used as a positive electrode active material, the voltage may steeply change at the end of charging-discharging, like a lithium-titanium composite oxide for the negative electrode. The spinel-structured lithium-manganese composite oxide has a similar crystal structure to that of the lithium-titanium composite oxide for the negative electrode active material, and therefore the available electric capacity increase accompanied by temperature elevation may be on the same level as that of the negative electrode. Accordingly, even though the available electric capacity ratio X is defined to fall with the range of the above-mentioned formula (1), the battery voltage at the end of charging-discharging may rapidly change, and the voltage difference relative to the voltage fluctuation could not be reduced. In case where an olivine-structured metal oxide such as $LiFePO_4$ as in the above-mentioned Patent Reference 4 is used as the positive electrode active material, the voltage may steeply change at the end of charging-discharging, like a lithium-titanium composite oxide for the negative electrode. Accordingly, the effect of the invention is given in a combination of a layer-structured lithium-transition metal composite oxide and a spinel-type lithium-titanium composite oxide.

A spinel-structured lithium-manganese composite oxide undergoes significant cycle degradation in a high-temperature environment owing to the Mn release in a high-temperature environment, and this is one reason for the difficulty in attaining the effect of the invention.

Accordingly, the positive electrode active material for use in the invention is preferably a layer-structured lithium-transition metal composite oxide.

An example of the battery pack according to this embodiment will now be described with reference to FIGS. 7 and 8.

Figure 7:
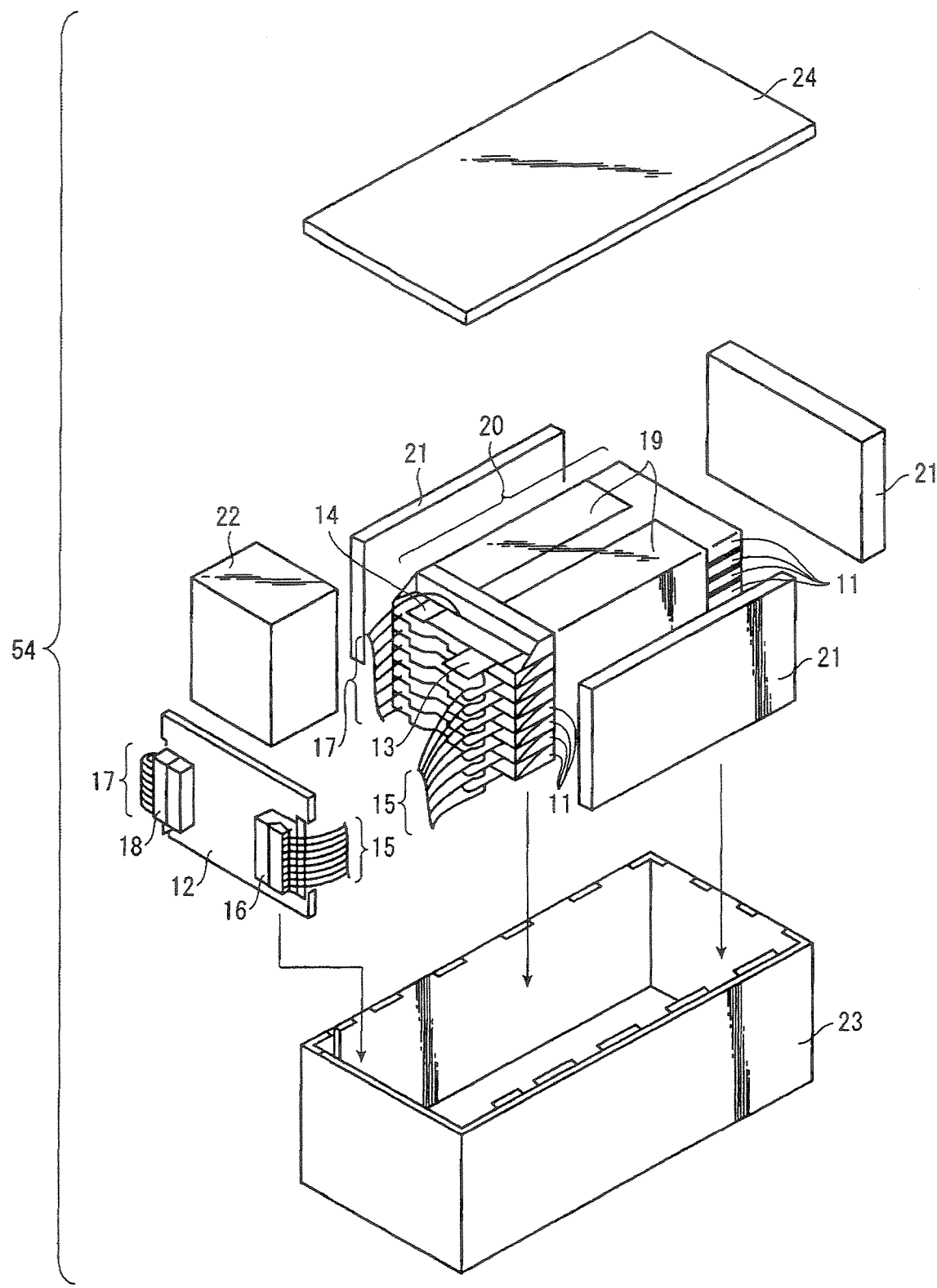
FIG. 7 is an oblique view showing in a dismantled fashion the construction of the battery pack according to a second embodiment.

FIG. 7 is an oblique view showing in a dismantled fashion the construction of the battery pack according to the second embodiment.

As shown in FIG. 7, a plurality of plate-like unit cells 11, e.g., 8 unit cells 11, are laminated one upon the other to form a parallelepiped laminate body 20 forming a battery module. As described previously, each of the unit cells 11 is constructed such that the positive electrode terminal 13 and the negative electrode terminal 14 connected to the positive electrode and the negative electrode, respectively, are withdrawn to the outside of the case. A printed wiring board 12 is arranged on the side toward which the positive electrode terminal 13 and the negative electrode terminal 14 are allowed to protrude.

The positive electrode terminal 13 is electrically connected to a connector 16 on the side of the positive electrode via a wiring 15 on the side of the positive electrode. Likewise, the negative electrode terminal 14 is electrically connected to a connector 18 on the side of the negative electrode via a wiring 17 on the side of the negative electrode. The connectors 16, 18 on the side of the positive electrode and the negative electrode, respectively, are connected to the counterpart connectors mounted to the printed wiring board 12.

The laminate body 20 of the unit cells 11 is fixed by adhesive tapes 19. Protective sheets 21 each formed of rubber or a resin are arranged to cover the three side surfaces of the laminate body 20 except the side toward which protrude the positive electrode terminal 13 and the negative electrode terminal 14. Also, a protective block 22 formed of rubber or a resin is arranged in the clearance between the side of the laminate body 20 and the printed wiring board 12.

The laminate body 20 is housed in a housing vessel 23 together with the protective sheets 21, the protective block 22 and the printed wiring board 12. Also, a lid 24 is mounted to close the upper open portion of the housing vessel 23.

Each constituent of the battery pack according to this embodiment will now be described in detail.

Figure 8:
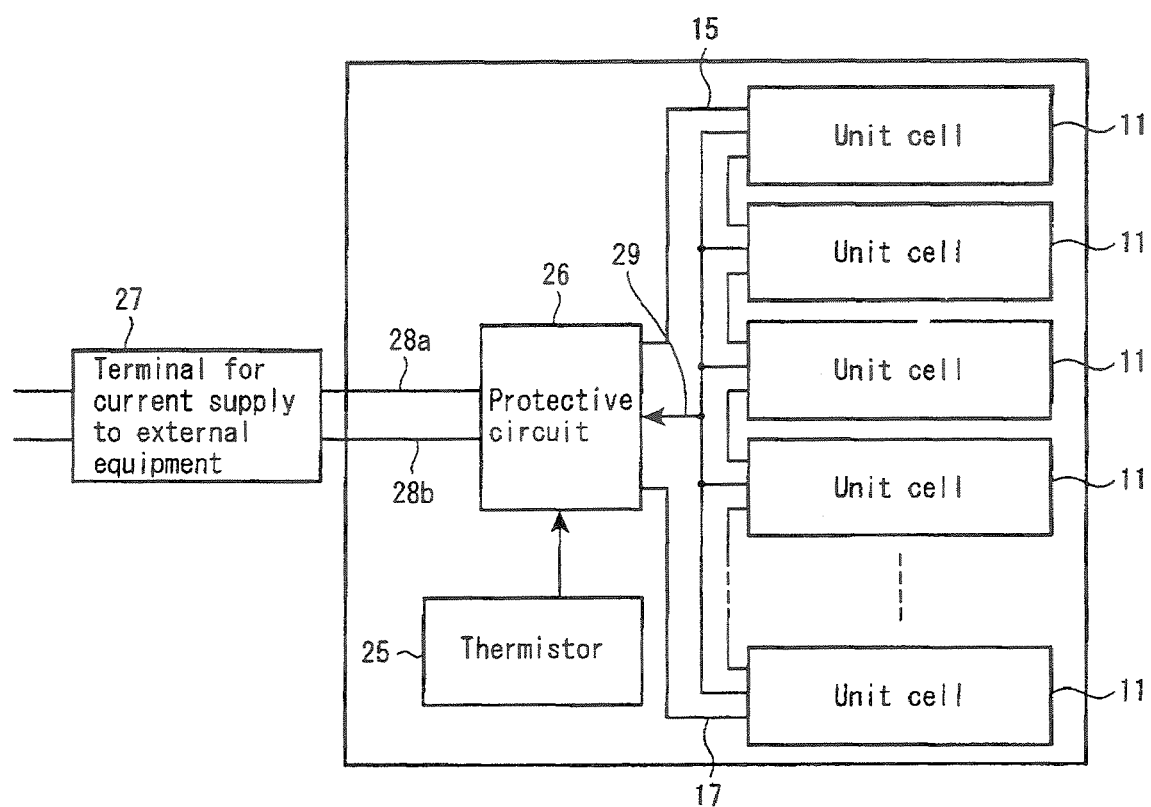
FIG. 8 is a block diagram showing the electric circuit of the battery pack according to the second embodiment.

As shown in FIG. 8, a thermistor 25, a protective circuit 26, and a terminal 27 for the current supply to the external apparatus are mounted to the printed wiring board 12.

The thermistor 25 serves to detect the temperature of the unit cell 11. The signal denoting the detected temperature is transmitted to the protective circuit 26.

As shown in FIG. 8, the protective circuit 26 is capable of breaking under prescribed conditions wirings 28a and 28b stretched between the protective circuit 26 and the terminal 27 for the current supply to the external apparatus. The prescribed conditions noted above include, for example, the case where the temperature detected by the thermistor 25 is higher than a prescribed temperature and the case of detecting, for example, the over-charging, the over-discharging and the over current of the unit cell 11. In the case of detecting the unit cells 11, it is possible to detect the battery voltage, the positive electrode potential or the negative electrode potential. Incidentally, in the case of detecting the electrode potential, a lithium electrode used as a reference electrode is inserted into the unit cell 11. In the case of FIG. 8, the protective circuit 26 is provided with a battery voltage monitoring circuit section. Each of the unit cells 11 is connected to the battery voltage monitoring circuit section via a wiring 29. According to the particular construction, the battery voltage of each of the unit cells 11 can be detected by the protective circuit 26. Incidentally, FIG. 8 covers the case of applying the detection to the individual unit cells 11. However, it is also possible to apply the detection to the battery module 20.

Further, in the case shown in FIG. 8, all the unit cells 11 included in the battery module 20 are detected in terms of voltage. Although it is particularly preferable that the voltages of all of the unit cells 11 of the battery module 20 should be detected, it may be sufficient to check the voltages of only some of the unit cells 11.

The battery pack according to the second embodiment is excellent in the control of the positive electrode potential or the negative electrode potential by the detection of the battery voltage and, thus, is particularly adapted for the case where the protective circuit detects the battery voltage.

It is possible to use a thermally shrinkable tape in place of the adhesive tape 19. In this case, the protective sheets 21 are arranged on both sides of the laminate body 20 and, after the thermally shrinkable tube is wound about the protective sheets 21, the thermally shrinkable tube is thermally shrunk to bond the laminate body 20.

Incidentally, FIG. 7 shows that the unit cells 11 are connected in series. However, it is also possible to connect the unit cells 11 in parallel to increase the capacity of the battery pack. Of course, it is also possible to connect the assembled battery packs in series and in parallel.

The embodiment of the battery pack can be changed appropriately depending on the use of the battery pack.

It is desirable for the battery pack according to this embodiment to be assumed for use under a high temperature environment. To be more specific, the battery pack can be mounted on a vehicle such as a hybrid electric vehicle having two to four wheels, an electric vehicle having two to four wheels, and an assist bicycle. Also, the battery pack can be used for the emergency power supply of an electronic apparatus, and a cleaner. It is appropriate for the battery pack mounted on a vehicle.

Where the battery pack is mounted on a vehicle, the battery pack is required to exhibit satisfactory charge-discharge cycle characteristics under a high temperature environment of about 60° C. When used for the emergency power supply of an electronic apparatus, the battery pack is required to exhibit satisfactory charge-discharge cycle characteristics under a high temperature environment of about 45° C.

Third Embodiment

A third embodiment is directed to a vehicle equipped with the battery pack according to the second embodiment. The vehicle noted above includes, for example, a hybrid electric vehicle having 2 to 4 wheels, an electric vehicle having 2 to 4 wheels, and an assist bicycle.

Figure 9:
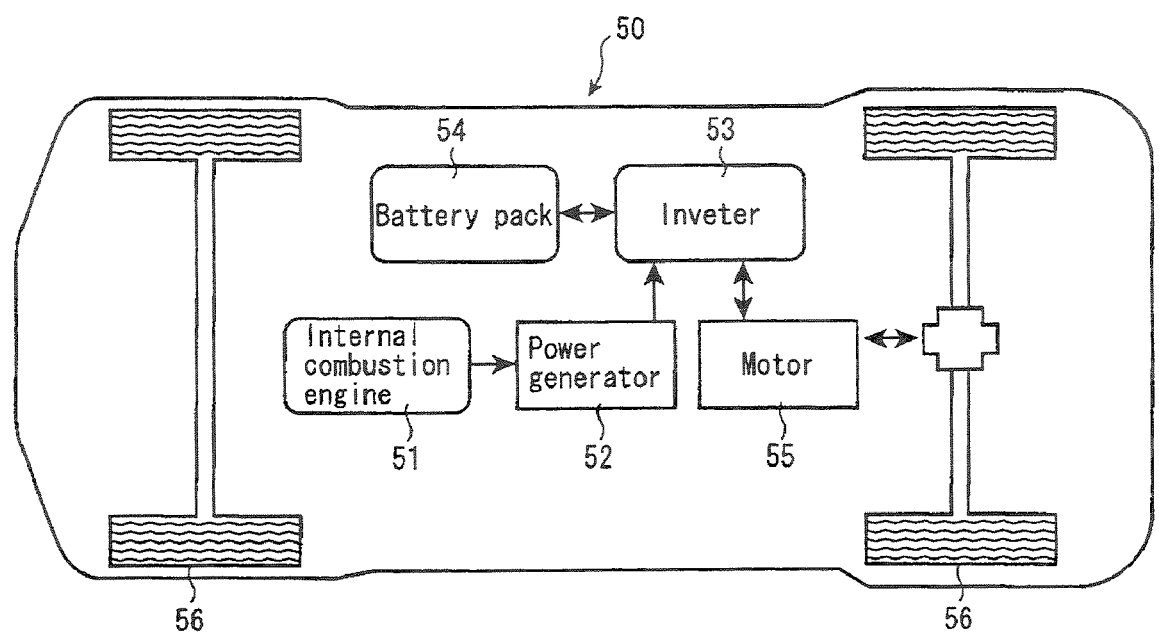
FIG. 9 schematically shows the construction of a series hybrid electric vehicle according to a third embodiment.
Figure 10:
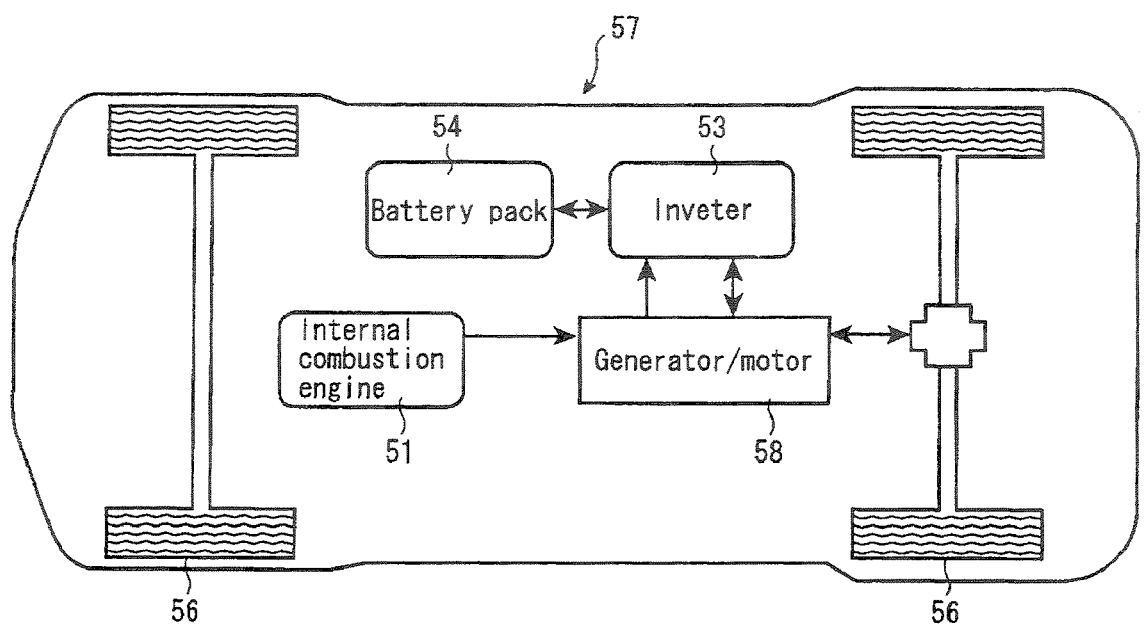
FIG. 10 schematically shows the construction of a parallel hybrid electric vehicle according to the third embodiment.
Figure 11:
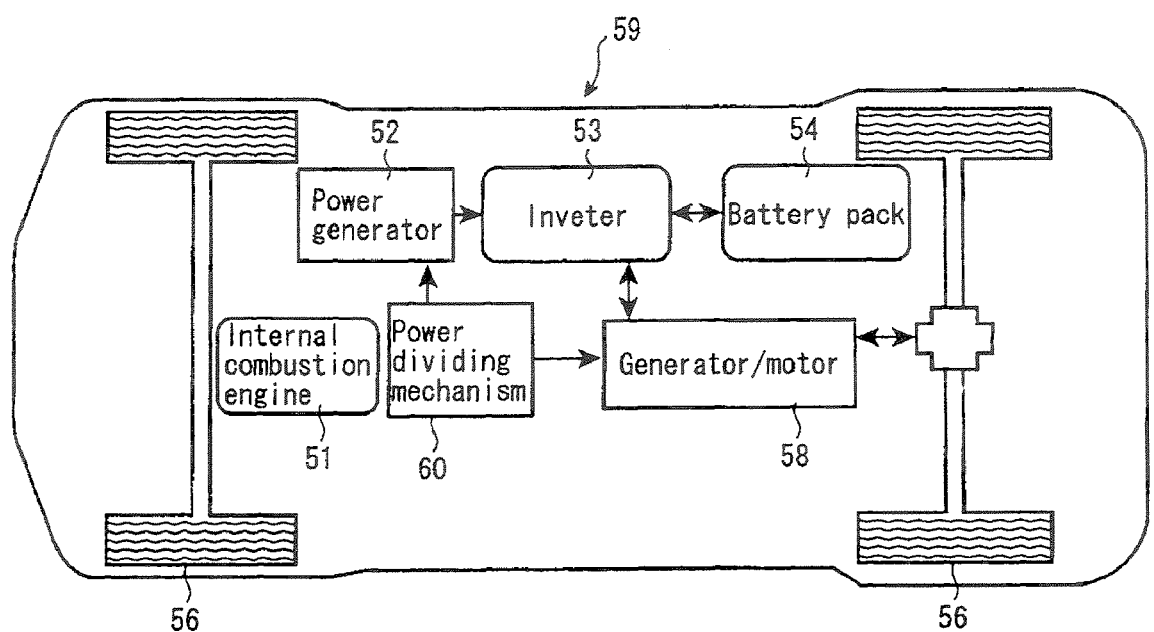
FIG. 11 schematically shows the construction of a series-parallel hybrid electric vehicle according to the third embodiment.

FIGS. 9 to 11 show various type of hybrid electric vehicles in which an internal combustion engine and a motor driven by a battery pack are used in combination as the power source for the driving. For driving the vehicle, required is the power source exhibiting a wide range of the rotation speed and the torque depending on the running conditions of the vehicle. Since the torque and the rotation speed exhibiting an ideal energy efficiency are limited in the internal combustion engine, the energy efficiency is lowered under the driving conditions other than the limited torque and the rotation speed. Since the hybrid electric vehicle includes the internal combustion engine and the electric motor, it is possible to improve the energy efficiency of the vehicle. Specifically, the internal combustion engine is operated under the optimum conditions so as to generate an electric power, and the wheels are driven by the electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid electric vehicle can be roughly classified into three types depending on the combination of the internal combustion engine and the electric motor.

FIG. 9 shows a hybrid electric vehicle 50 that is generally called a series hybrid electric vehicle. The motive power of an internal combustion engine 51 is once converted entirely into an electric power by a power generator 52, and the electric power thus converted is stored in a battery pack 54 via an inverter 53. The battery pack according to the fourth embodiment of the present invention is used as the battery pack 54. The electric power stored in the battery pack 54 is supplied to an electric motor 55 via the inverter 53, with the result that wheels 56 are driven by the electric motor 55. In other words, the hybrid electric vehicle 50 shown in FIG. 9 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid electric vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above denotes the capacity at the time when the battery pack is discharged at a rate of 0.2 C.

FIG. 10 shows the construction of a hybrid electric vehicle 57 that is called a parallel hybrid electric vehicle. A reference numeral 58 shown in FIG. 10 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid electric vehicle 57 shown in FIG. 10 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 5 to 10 Ah.

FIG. 11 shows the construction of a hybrid electric vehicle 59 that is called a series-parallel hybrid electric vehicle, which utilizes in combination both the series type system and the parallel type system. A power dividing mechanism 60 included in the hybrid electric vehicle 59 divides the output of the internal combustion engine 51 into the energy for the power generation and the energy for the wheel driving. The series-parallel hybrid electric vehicle 59 permits controlling the load of the engine more finely than the parallel hybrid electric vehicle so as to improve the energy efficiency.

It is desirable for the rated capacity of the battery pack to fall within a range of 1 to 20 Ah, more desirably 5 to 10 Ah.

The nominal voltage of the battery pack to be mounted on hybrid electric vehicles as in the above-mentioned FIG. 9 to FIG. 11 is preferably within a range of from 200 to 600 V.

The battery pack according to the second embodiment is adapted for use in the series-parallel hybrid electric vehicle.

Figure 12:
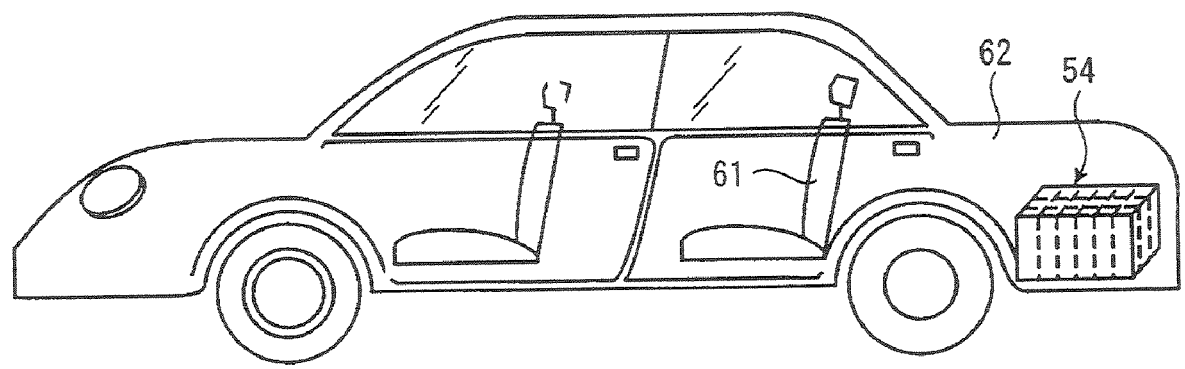
FIG. 12 schematically shows the construction of a hybrid electric vehicle according to the third embodiment.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type hybrid electric vehicle shown in FIG. 12, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the hybrid electric vehicle.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery having a very large capacity. It is desirable for the rated capacity of the battery pack to fall within a range of 100 to 500 Ah, more desirably 200 to 400 Ah.

The weight of the battery pack occupies a large ratio of the weight of the electric vehicle. Therefore, it is desirable for the battery pack to be arranged in a low position that is not markedly apart from the center of gravity of the electric vehicle. For example, it is desirable for the battery pack to be arranged below the floor of the electric vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 13:
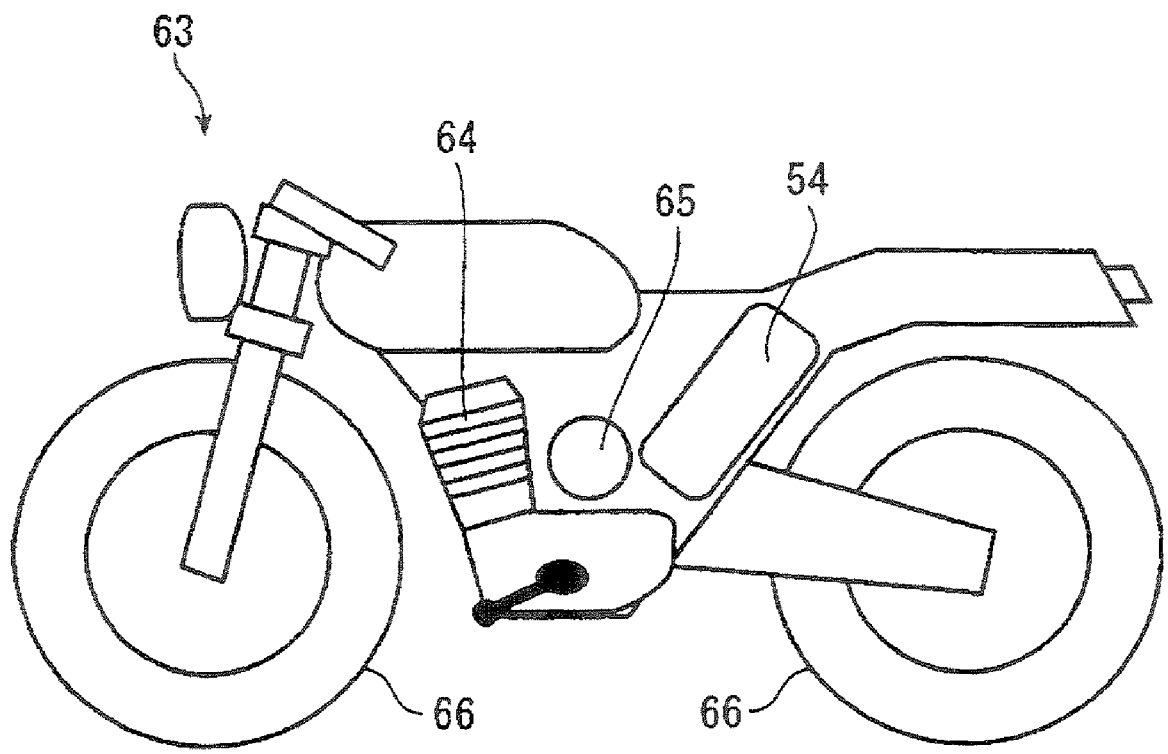
FIG. 13 schematically shows the construction of a hybrid electric motor bicycle according to the third embodiment.

FIG. 13 exemplifies the construction of a hybrid electric motor bicycle. It is possible to construct a hybrid electric motor bicycle exhibiting a high energy efficiency and equipped with an internal combustion engine 64, an electric motor 65, and the battery pack 54 like the hybrid electric vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the electric motor bicycle is increased, the driving force of the electric motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 14:
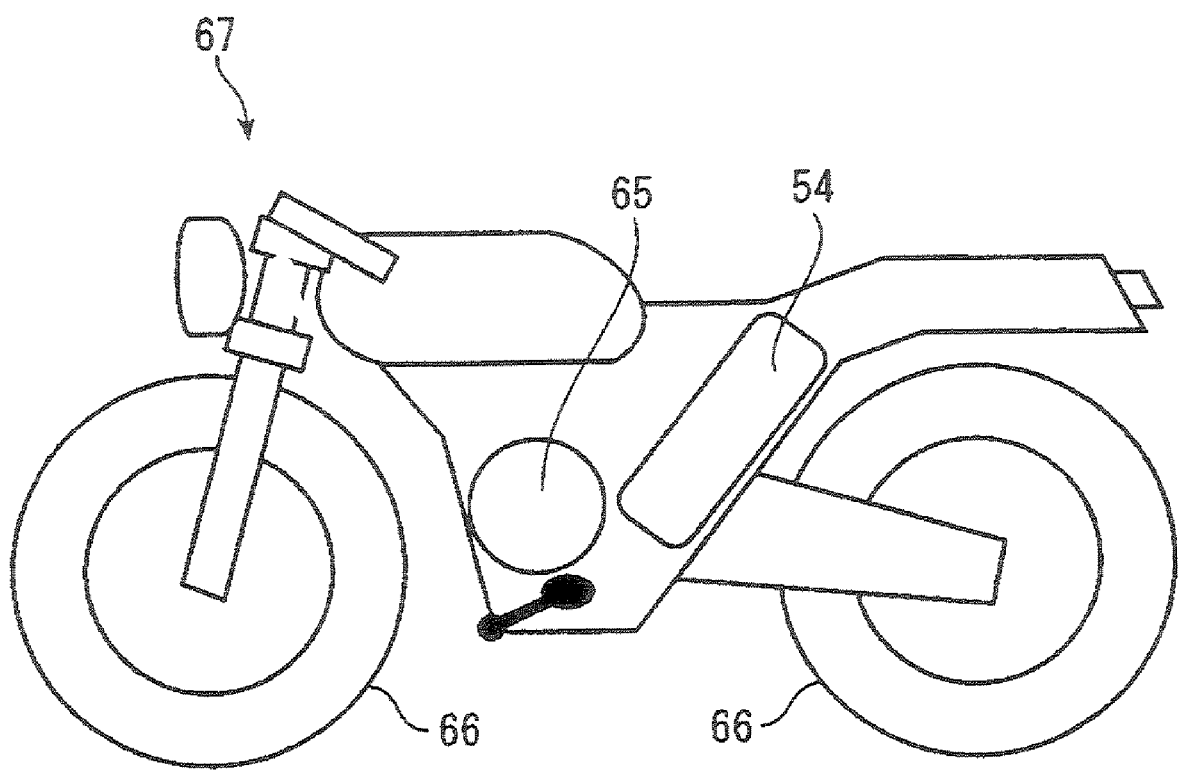
FIG. 14 schematically shows the construction of an electric motor bicycle according to the third embodiment.

FIG. 14 exemplifies the construction of an electric motor bicycle 67. The electric motor bicycle 67 is driven by the energy stored in the battery pack 54 that is charged by the supply of the electric power from the outside. Since all the driving force required for the driving the electric motor bicycle 67 is generated from the electric motor 65, it is necessary to use the electric motor 65 of a high output. Also, since it is necessary for the battery pack to store all the energy required for one driving by one charging, it is necessary to use a battery having a relatively large capacity. It is desirable for the rated capacity of the battery pack to fall within a range of 10 to 50 Ah, more desirably 15 to 30 Ah.

Figure 15:
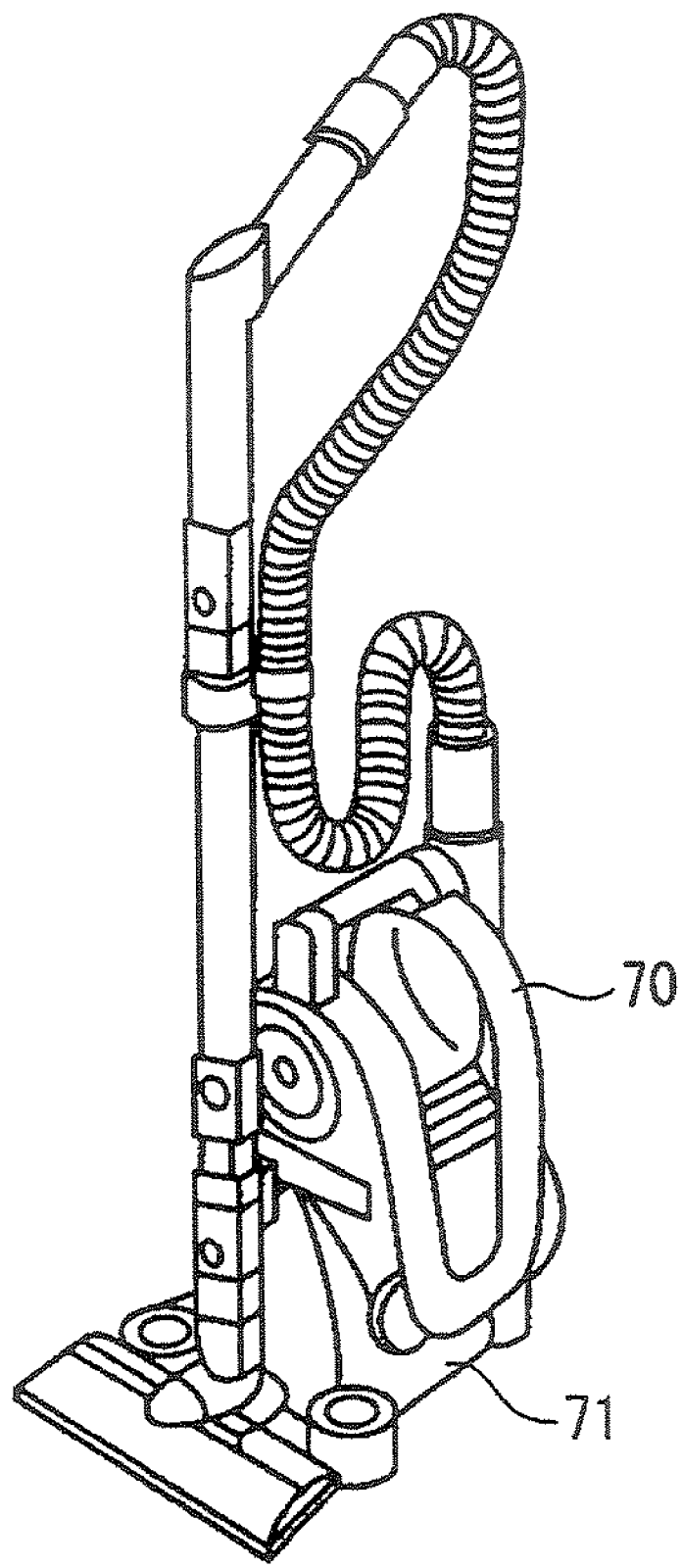
FIG. 15 schematically shows a charge-type vacuum cleaner according to the third embodiment.

FIG. 15 shows one example of a charge-type vacuum cleaner according to the third embodiment. The charge-type vacuum cleaner is provided with a housing 70 of the cleaner and a battery pack of the second embodiment as housed in the housing 70. In addition, the charge-type vacuum cleaner is provided with a charger 71 that serves also as a stand. The rated capacity of the battery pack is preferably within a range of from 2 to 10 Ah. More preferably, it is within a range of from 2 to 4 Ah. The nominal voltage of the battery pack is preferably within a range of from 40 to 80 V.

Examples of the present invention will now be described. Of course, the technical scope of the present invention is not limited to the following Examples as far as the subject matter of the present invention is not exceeded.

Charge-Discharge Cycle Test 1

Example 1

Preparation of Positive Electrode

In the first step, prepared was a lithium-cobalt composite oxide powder represented by $LiCoO_2$ and having a layered halite type crystal structure, which was used as the positive electrode active material. Next, prepared was a slurry by adding 90% by weight of the positive electrode active material, 5% by weight of acetylene black used as a conductive agent, and 5% by weight of polyvinylidene fluoride (PVdF) used as a binder, to N-methyl pyrrolidone (NMP), followed by coating both surfaces of a current collector formed of an aluminum foil having a thickness of 15 μm with the slurry thus prepared and subsequently drying and, then, pressing the current collector having the dried slurry coated thereon to obtain a positive electrode having an electrode density of 3.3 g/cm³.

The available electric capacity "A" of the positive electrode at 25° C. was found to be 1.2 mAh/cm².

<Preparation of Negative Electrode>

Prepared was a lithium-titanium composite oxide powder represented by $Li_4Ti_5O_{12}$ and having a spinel structure and an average particle diameter of 0.8 μm, which was used as a negative electrode active material. Next, prepared was a slurry by adding 90% by weight of the negative electrode active material, 5% by weight of coke baked at 1,200° C., and having the lattice spacing d002 of 0.3465 nm and an average particle diameter of 3 μm, which was used as the conductive agent, and 5% by weight of polyvinylidene fluoride (PVdF) used as a binder, to N-methyl pyrrolidone (NMP), followed by coating both surfaces of an aluminum foil having a thickness of 15 μm, which was used as a current collector, with the slurry thus prepared and subsequently drying and, then, pressing the current collector coated with the dried slurry to obtain a negative electrode having an electrode density of 2.4 g/cm³.

The available electric capacity "B" of the negative electrode at 25° C. was found to be 1.5 mAh/cm².

<Preparation of Electrode Group>

A laminate structure comprising the positive electrode, a separator formed of a porous polyethylene film, the negative electrode, and another separator, which were laminated one upon the other in the order mentioned, was spirally wound, followed by pressing the wound laminate structure at 90° C. to obtain a flattened electrode group having a width of 30 mm, and a thickness of 3.0 mm. The electrode group thus prepared was housed in a pack formed of a laminate film and subjected to vacuum drying at 80° C. for 24 hours. The laminate film had a laminate structure comprising an aluminium foil having a thickness of 40 μm, a nylon layer on the outer surface thereof and a polyethylene layer on the inner surface thereof. And the laminate film had a thickness of 0.15 mm.

<Preparation of Liquid Nonaqueous Electrolyte>

A liquid nonaqueous electrolyte was prepared by dissolving $LiBF_4$ used as an electrolyte in a mixed solvent consisting of ethylene carbonate (EC) and γ butyrolactone (GBL), which were mixed at a volume ratio of 1:2. The electrolyte was dissolved in the mixed solvent in an amount of 1.5 mol/L.

The liquid nonaqueous electrolyte thus prepared was poured into the laminate film pack having the electrode group housed therein, followed by completely closing the pack by means of heat seal to obtain 10 nonaqueous electrolyte secondary batteries each constructed as shown in FIG. 1, having a width of 35 mm, a thickness of 3.2 mm, and a height of 65 mm, and a rated capacity of 3 Ah.

Examples 2 to 6

A nonaqueous electrolyte secondary battery was prepared as in Example 1, except that the electrode coating amount (slurry coating amount) was controlled to permit the negative electrode to have a value of the available electric capacity "B" as shown in Table 1.

Comparative Examples 1 and 2

A nonaqueous electrolyte secondary battery was prepared as in Example 1, except that the electrode coating amount was controlled to permit the negative electrode to have a value of the available electric capacity "B" as shown in Table 1.

Comparative Example 3

A nonaqueous electrolyte secondary battery was prepared as in Example 1, except that a ramsdellite type lithium-titanium composite oxide represented by $Li_2Ti_3O_7$ was used as the negative electrode active material.

Comparative Example 4

A nonaqueous electrolyte secondary battery was prepared as in Example 1, except that a lithium-manganese oxide powder having the composition represented by $LiMn_2O_4$ and having the spinel type crystal structure was used as the positive electrode active material.

Comparative Example 5

A nonaqueous electrolyte secondary battery was prepared as in Example 1, except that an oxide powder having the composition represented by LiFePO$_4$ and having the olivine type crystal structure was used as the positive electrode active material.

300 cycles of charge-discharge cycle test was applied to each of the nonaqueous electrolyte secondary battery prepared in Examples 1 to 6 and Comparative Examples 1 to 5 under a temperature environment of 25° C., 45° C. and 60° C. In the charge-discharge cycle test, the charging operation at 5 C and the discharging operation at 1 C were alternately repeated within a battery voltage of 1.5 to 2.7 V.

The ratio (%) of the discharge capacity of the nonaqueous electrolyte secondary battery at the 300th cycle of the test to the discharge capacity at the first cycle of the test is shown in Table 1 as the capacity retention ratio.

type lithium-titanium composite oxide is used as the negative electrode active material, in Comparative Example 4 where a spinel-type lithium-manganese composite oxide is used as the positive electrode active material, and in Comparative Example 5 where an olivine-type crystal structure-having oxide is used as the positive electrode active material, the capacity retention ratio at 45° C. and 60° C. is lower than that in Examples 1 to 6.

Charge-Discharge Cycle Test 2

Example 7

A nonaqueous electrolyte secondary battery was prepared as in Example 1, except that a lithium-nickel-cobalt-alumi-

TABLE 1

| | Positive electrode capacity (mAh/cm$^2$) | Negative electrode capacity (mAh/cm$^2$) | Available electric capacity ratio x | Capacity retention ratio under a temperature environment of 25° (%) | Capacity retention ratio under a temperature environment of 45° (%) | Capacity retention ratio under a temperature environment of 60° (%) |
|---|---|---|---|---|---|---|
| Example 1 | 1.20 | 1.50 | 1.25 | 92 | 85 | 80 |
| Example 2 | 1.20 | 1.55 | 1.29 | 93 | 87 | 83 |
| Example 3 | 1.20 | 1.60 | 1.33 | 93 | 88 | 84 |
| Example 4 | 1.20 | 1.70 | 1.42 | 94 | 90 | 86 |
| Example 5 | 1.20 | 1.80 | 1.50 | 95 | 93 | 88 |
| Example 6 | 1.20 | 2.40 | 2.00 | 95 | 88 | 78 |
| Comparative Example 1 | 1.20 | 1.35 | 1.13 | 88 | 23 | 0 |
| Comparative Example 2 | 1.20 | 1.40 | 1.17 | 90 | 42 | 0 |
| Comparative Example 3 | 1.20 | 1.50 | 1.25 | 88 | 30 | 0 |
| Comparative Example 4 | 1.20 | 1.50 | 1.25 | 91 | 40 | 0 |
| Comparative Example 5 | 1.20 | 1.50 | 1.25 | 90 | 40 | 0 |

As shown in Table 1, the capacity retention ratio of the battery pack for each of Examples 1 to 6 is higher than that for each of Comparative Examples 1 to 4 under a temperature environment of any of 25° C., 45° C. and 60° C. The experimental data clearly support that the nonaqueous electrolyte secondary battery according to the embodiment exhibits an excellent charge-discharge cycle characteristics under a wide temperature range of room temperature to high temperatures.

In particular, in Examples 1 to 5 where the available electric capacity ratio X is from 1.25 to 1.5, the capacity retention ratio in a high-temperature atmosphere at 60° C. is high, as compared with that in Example 6 where the available electric capacity ratio X is more than 1.5. And it is understood that, in order to obtain satisfactory cycle characteristics in a high-temperature environment, the available electric capacity ratio X is preferably within a range of from 1.25 to 1.5.

As opposed to it, in Comparative Examples 1 and 2 where the available electric capacity ratio X is less than 1.25, the capacity retention ratio at 45° C. and 60° C. is lower than that in Examples 1 to 6. In Comparative Example 3 where the available electric capacity ratio X is 1.25 but a ramsdellitenum composite oxide powder represented by LiNi$_{0.75}$Co$_{0.19}$Al$_{0.05}$O$_2$ and having a layered halite type crystal structure was used as the positive electrode active material.

Examples 8 to 12

A nonaqueous electrolyte secondary battery was prepared as in Example 7, except that the electrode coating amount was controlled to permit the negative electrode to exhibit a value of the available electric capacity as shown in Table 2.

Comparative Examples 6 and 7

A nonaqueous electrolyte secondary battery was prepared as in Example 7, except that the electrode coating amount was controlled to permit the negative electrode to exhibit a value of the available electric capacity as shown in Table 2.

A charge-discharge cycle test was applied as in charge-discharge cycle test 1 to each of the nonaqueous electrolyte secondary battery prepared in each of Examples 7 to 12 and Comparative Examples 6 and 7. Table 2 also shows the result.

TABLE 2

| | Positive electrode capacity (mAh/cm$^2$) | Negative electrode capacity (mAh/cm$^2$) | Available electric capacity ratio x | Capacity retention ratio under a temperature environment of 25° (%) | Capacity retention ratio under a temperature environment of 45° (%) | Capacity retention ratio under a temperature environment of 60° (%) |
|---|---|---|---|---|---|---|
| Example 7 | 1.20 | 1.50 | 1.25 | 83 | 77 | 69 |
| Example 8 | 1.20 | 1.55 | 1.29 | 84 | 78 | 70 |
| Example 9 | 1.20 | 1.60 | 1.33 | 84 | 78 | 70 |
| Example 10 | 1.20 | 1.70 | 1.42 | 86 | 80 | 72 |

TABLE 2-continued

|  | Positive electrode capacity (mAh/cm$^2$) | Negative electrode capacity (mAh/cm$^2$) | Available electric capacity ratio x | Capacity retention ratio under a temperature environment of 25° (%) | Capacity retention ratio under a temperature environment of 45° (%) | Capacity retention ratio under a temperature environment of 60° (%) |
|---|---|---|---|---|---|---|
| Example 11 | 1.20 | 1.80 | 1.50 | 88 | 82 | 74 |
| Example 12 | 1.20 | 2.40 | 2.00 | 87 | 77 | 67 |
| Comparative Example 6 | 1.20 | 1.35 | 1.13 | 80 | 42 | 0 |
| Comparative Example 7 | 1.20 | 1.40 | 1.17 | 81 | 21 | 0 |

As shown in Table 2, the capacity retention ratio of the battery pack for each of Examples 7 to 12 is higher than that for each of Comparative Examples 6 and 7 under a temperature environment of any of 25° C., 45° C. and 60° C. The experimental data clearly support that the nonaqueous electrolyte secondary battery according to the embodiment exhibits an excellent charge-discharge cycle characteristics under a wide temperature range of room temperature to high temperatures.

In particular, in Examples 7 to 11 where the available electric capacity ratio X is from 1.25 to 1.5, the capacity retention ratio in a high-temperature environment at 60° C. is larger than that in Example 12 where the available electric capacity ratio X is more than 1.5.

The results in Examples 1 to 12 confirm that the use of a lithium-transition metal oxide represented by Li$_y$M1$_{z1}$M2$_{z2}$O$_2$ and having a layered crystal structure as the positive electrode active material improves the cycle characteristics of the battery at high temperature.

Charge-Discharge Cycle Test 3

Examples 13 to 21

For investigating the relationship between the Ni content and the cycle characteristics of a case where Ni and Co are used as M1 and the sum total of M1 and M2 is a fixed value of 1, secondary batteries of the following Examples 13 to 20 were produced.

A nonaqueous electrolyte secondary battery was prepared as in Example 1, except that a lithium-nickel-cobalt composite oxide powder represented by LiNi$_a$Co$_{(1-a)}$O$_2$, the nickel molar ratio "a" being shown in Table 3, and having a layered halite type crystal structure was used as the positive electrode active material.

A charge-discharge cycle test was applied as in charge-discharge cycle test 1 to each of the nonaqueous electrolyte secondary batteries thus prepared. Table 3 also shows the result.

TABLE 3

|  | LiNi$_a$Co$_{(1-a)}$O$_2$ a= | Positive electrode capacity (mAh/cm$^2$) | Negative electrode capacity (mAh/cm$^2$) | Available electric capacity ratio x | Capacity retention ratio under a temperature environment of 25° (%) | Capacity retention ratio under a temperature environment of 45° (%) | Capacity retention ratio under a temperature environment of 60° (%) |
|---|---|---|---|---|---|---|---|
| Example 13 | 0.00 | 1.20 | 1.50 | 1.25 | 92 | 85 | 80 |
| Example 14 | 0.25 | 1.20 | 1.50 | 1.25 | 88 | 81 | 75 |
| Example 15 | 0.30 | 1.20 | 1.50 | 1.25 | 86 | 80 | 73 |
| Example 16 | 0.50 | 1.20 | 1.50 | 1.25 | 84 | 78 | 70 |
| Example 17 | 0.75 | 1.20 | 1.50 | 1.25 | 82 | 74 | 65 |
| Example 18 | 0.85 | 1.20 | 1.50 | 1.25 | 81 | 72 | 64 |
| Example 19 | 0.90 | 1.20 | 1.50 | 1.25 | 78 | 67 | 61 |
| Example 20 | 1.00 | 1.20 | 1.50 | 1.25 | 74 | 64 | 58 |

As shown in Table 3, the nonaqueous electrolyte secondary battery for each of Examples 13 to 18 exhibits a high capacity retention ratio under a temperature environment of any of 25° C., 45° C. and 60° C., compared with the battery pack for each of Examples 19 and 20. The experimental data clearly support that the nonaqueous electrolyte secondary battery using the lithium-transition metal oxide, in which the Ni mole amount is not larger than 0.85 (including 0.0) based on the sum of the mole amount of M1 and M2, permits further improving the charge-discharge cycle characteristics over a wide temperature region ranging between room temperature and a high temperature.

Charge-Discharge Cycle Test 4

Examples 21 to 24

A nonaqueous electrolyte secondary battery was prepared as in Example 1, except that a lithium-nickel-cobalt-manganese composite oxide powder represented by LiNi$_b$Co$_{0.34}$Mn$_{(0.66-b)}$O$_2$, the nickel molar ratio "b" being shown in Table 4, and having a layered halite type crystal structure was used as the positive electrode active material.

A charge-discharge cycle test was applied as in charge-discharge cycle test 1 to each of the nonaqueous electrolyte secondary batteries thus prepared. Table 4 also shows the result.

TABLE 4

| | $LiNi_bCo_{0.34}Mn_{(0.66-b)}O_2$ b= | Positive electrode capacity (mAh/cm$^2$) | Negative electrode capacity (mAh/cm$^2$) | Available electric capacity ratio x | Capacity retention ratio under a temperature environment of 25° (%) | Capacity retention ratio under a temperature environment of 45° (%) | Capacity retention ratio under a temperature environment of 60° (%) |
|---|---|---|---|---|---|---|---|
| Example 21 | 0.00 | 1.20 | 1.50 | 1.25 | 86 | 78 | 72 |
| Example 22 | 0.16 | 1.20 | 1.50 | 1.25 | 86 | 77 | 70 |
| Example 23 | 0.33 | 1.20 | 1.50 | 1.25 | 90 | 82 | 78 |
| Example 24 | 0.50 | 1.20 | 1.50 | 1.25 | 84 | 76 | 65 |

The experimental data given in Table 4 support that the charge-discharge cycle characteristics of the nonaqueous electrolyte secondary battery can be improved under a high temperature environment even in the case of using a lithium-transition metal oxide containing manganese as the positive electrode active material.

The available electric capacity of the positive electrode and that of the negative electrode used in the Examples described above will now be described.

<Measuring Method of Available Electric Capacity>

The positive electrode will now be described first.

A positive electrode as a working electrode and a lithium metal foil as a counter electrode are arranged to face each other with a glass filter used as a separator interposed therebetween in a dry argon atmosphere and, then, a lithium metal sheet is inserted as a reference electrode so as not to touch any of the working electrode and the counter electrode in the dry argon atmosphere. These three members are put in a three pole type glass cell to bring the working electrode, the counter electrode and the reference electrode into contact with the terminals of the glass cell, respectively. Then, an electrolysis solution is poured into the glass cell, followed by hermetically closing the glass cell under the state that the separator and the electrodes are sufficiently impregnated with the electrolysis solution. Incidentally, the electrolysis solution used was prepared by dissolving LiBF4 used as an electrolyte in a mixed solvent prepared by mixing ethylene carbonate (EC) and γ-butyrolactone (GBL) in a mixing ratio by volume of 1:2. The produced glass cell was charged for 10 hours in a mode of constant current-constant voltage charging at a current of 0.2 C and at a potential to a lithium metal of 4.25 V in an environment at 25° C., and then it was subjected to constant current discharging at a current of 0.2 C until its potential to a lithium metal could reach 3.5 V. The electric capacity in discharging is the available electric capacity of the positive electrode at 25° C. The obtained available electric capacity is divided by the area of the positive electrode layer of the positive electrode to give the available electric capacity A (mAh/cm$^2$) per unit area of the positive electrode in an environment at 25° C.

Next, the negative electrode will be described.

A half-cell was prepared as above, except that a negative electrode was used in place of the positive electrode. The produced glass cell was charged for 10 hours in a mode of constant current-constant voltage charging at a current of 0.2 C and at a potential to a lithium metal of 0.4 V in an environment at 25° C., and then it was subjected to constant current discharging at a current of 0.2 C until its potential to a lithium metal could reach 2.0 V. The electric capacity in discharging is the available electric capacity of the negative electrode at 25° C. The obtained available electric capacity is divided by the area of the negative electrode layer of the negative electrode to give the available electric capacity B (mAh/cm$^2$) per unit area of the negative electrode in an environment at 25° C.

Incidentally, the charging was performed with a low current in order to permit the charging reaction to be finished sufficiently.

Incidentally, the temperature environment for measuring the available electric capacity was formed by using, for example, a constant temperature vessel type No. EC-45MTP manufactured by Hitachi Ltd.

<Measuring Method of the Composition of Lithium-Transition Metal Oxide>

The composition of the lithium-transition metal oxide can be quantified by, for example, an inductively coupled plasma atomic emission spectroscopy (ICP-AES).

<Measuring Method of Crystal Structure of Lithium-Transition Metal Oxide>

The crystal structure can be identified by an XRD analysis. Concerning the known substance, the crystal structure can be identified by performing the XRD measurement, followed by comparing the obtained pattern with the JCPDS (Joint Committee on Powder Diffraction Standards) card. When it comes to an unknown substance, the crystal structure can be identified by employing the technology described in, for example, Chapter 10 of "Shinban B. D. Cullity Xsenkaisetsu youron (B. D. Cullity, Elements of X-ray Diffraction, new Edition)", translated by Gentaro Matsumura and published by Agne Showfu-sha Inc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A nonaqueous electrolyte battery comprising:
a positive electrode containing a positive electrode current collector, and a positive electrode layer which is formed on both surfaces of the positive electrode current collector and contains a lithium-transition metal oxide having a layered crystal structure;
a negative electrode containing a negative electrode current collector, and a negative electrode layer which is formed on both surfaces of the negative electrode current collector and contains a lithium-titanium composite oxide having a spinel structure; and
a nonaqueous electrolyte,
wherein the positive electrode and the negative electrode satisfy the formula given below:

$$1.33 \leq X \leq 2.00,$$

where X is a ratio of an available electric capacity, represented by "(B/A)", A is an available electric capacity (mAh) at 25° C. per cm² of the positive electrode, and B is an available electric capacity (mAh) at 25° C. per cm² of the negative electrode, the available electric capacity of each of the positive electrodes is an electric capacity obtained by charging under a constant current of 0.2 C to reach 4.25 V, followed by discharging under a constant current of 0.2 C to reach 3.5 V, and the available electric capacity of each of the negative electrodes is an electric capacity obtained by charging under a constant current of 0.2 C to reach 1.0 V, followed by discharging under a constant current of 0.2 C to reach 2.0 V.

2. The nonaqueous electrolyte battery according to claim 1, wherein an amount of increase in an available electric capacity of the positive electrode accompanying a temperature elevation is less than an amount of increase in an available electric capacity of the negative electrode accompanying the temperature elevation.

3. The nonaqueous electrolyte battery according to claim 1, wherein the formula $$1.33 \leq X \leq 1.50$$

is satisfied by the positive electrode and the negative electrode.

4. The nonaqueous electrolyte battery according to claim 1, wherein the lithium-transition metal oxide includes at least one composite oxide selected from the group consisting of lithium-cobalt composite oxides, lithium-nickel composite oxides, and lithium-manganese composite oxides.

5. The nonaqueous electrolyte battery according to claim 1, wherein the lithium-transition metal oxide is represented by a composition formula of $Li_yM1_{z1}M2_{z2}O_2$, where M1 is at least one element selected from the group consisting of Co, Ni and Mn, M2 is at least one element selected from the group consisting of Fe, Al, B, Ga and Nb, and $0 < y \leq 1.2$, $0.98 \leq z1+z2 \leq 1.2$ and $0 \leq z2 < 0.2$, and where a ratio of a Ni amount to a sum of a M1 amount and a M2 amount is not larger than 0.85 (including 0).

6. The nonaqueous electrolyte battery according to claim 1, wherein the lithium-titanium composite oxide has an average particle diameter not larger than 1 μm.

7. The nonaqueous electrolyte battery according to claim 1, wherein the negative electrode comprises a negative electrode current collector comprising aluminum having an average crystal grain diameter not larger than 50 μm or an aluminum alloy having an average crystal grain diameter not larger than 50 μm.

8. The nonaqueous electrolyte battery according to claim 1, wherein the nonaqueous electrolyte contains at least two selected from the group consisting of propylene carbonate, ethylene carbonate and γ butyrolactone.

9. The nonaqueous electrolyte battery according to claim 1, further comprising a case comprising a laminate film having a thickness not larger than 0.5 mm.

10. The nonaqueous electrolyte battery according to claim 1, further comprising a separator, wherein the positive electrode and the negative electrode are alternately interposed between the separator to form a laminate-structured electrode group.

11. The nonaqueous electrolyte battery according to claim 10, wherein the separator is belt-like and zigzag-folded, and the positive electrode and the negative electrode are alternately disposed between a part of a zigzag-fold of the separator.

12. The nonaqueous electrolyte battery according to claim 1, further comprising
a case;
a positive electrode terminal electrically connected to the positive electrode; and
a negative electrode terminal electrically connected to the negative electrode, wherein
a tip of the positive electrode terminal is withdrawn from the case to the outside;
a tip of the negative electrode terminal is withdrawn from the case to the outside; and
a direction of the positive electrode terminal withdrawn from the case is opposed to a direction of the negative electrode terminal withdrawn from the case.

13. A battery pack comprising nonaqueous electrolyte batteries, each comprising:
a positive electrode containing a positive electrode current collector, and a positive electrode layer which is formed on both surfaces of the positive electrode current collector and contains a lithium-transition metal oxide having a layered crystal structure;
a negative electrode containing a negative electrode current collector, and a negative electrode layer which is formed on both surfaces of the negative electrode current collector and contains a lithium-titanium composite oxide having a spinel structure; and
a nonaqueous electrolyte,
wherein in each of the nonaqueous electrolyte batteries the positive electrode and the negative electrode satisfy the formula given below:

$$1.33 \leq X \leq 2.00,$$

where X is a ratio of an available electric capacity, represented by "(B/A)", A is an available electric capacity (mAh) at 25° C. per cm² of the positive electrode, and B is an available electric capacity (mAh) at 25° C. per cm² of the negative electrode, the available electric capacity of each of the positive electrodes is an electric capacity obtained by charging under a constant current of 0.2 C to reach 4.25 V, followed by discharging under a constant current of 0.2 C to reach 3.5 V, and the available electric capacity of each of the negative electrodes is an electric capacity obtained by charging under a constant current of 0.2 C to reach 1.0 V, followed by discharging under a constant current of 0.2 C to reach 2.0 V.

14. The nonaqueous electrolyte battery according to claim 13, wherein the formula $$1.33 \leq X \leq 1.50$$

is satisfied by the positive electrode and the negative electrode.

15. The nonaqueous electrolyte battery according to claim 13, wherein the lithium-transition metal oxide includes at least one composite oxide selected from the group consisting of lithium-cobalt composite oxides, lithium-nickel composite oxides, and lithium-manganese composite oxides.

16. The nonaqueous electrolyte battery according to claim 13, wherein the lithium-transition metal oxide is represented by a composition formula of $Li_yM1_{z1}M2_{z2}O_2$, where M1 is at least one element selected from the group consisting of Co, Ni and Mn, M2 is at least one element selected from the group consisting of Fe, Al, B, Ga and Nb, and $0 < y \leq 1.2$, $0.98 \leq z1+z2 \leq 1.2$ and $0 \leq z2 < 0.2$, and where a ratio of a Ni amount to a sum of a M1 amount and a M2 amount is not larger than 0.85 (including 0).

17. The battery pack according to claim 13, further comprising a protective circuit which detects a voltage of each of the nonaqueous electrolyte batteries.

18. A vehicle comprising the battery pack as defined in claim 13.

19. The nonaqueous electrolyte battery according to claim 1, wherein the lithium-transition metal oxide has a layered halite crystal structure.

20. The battery pack according to claim 13, wherein the lithium-transition oxide of the positive electrode has a layered halite structure.

* * * * *